US008860887B2

(12) United States Patent
Nakajima et al.

(10) Patent No.: US 8,860,887 B2
(45) Date of Patent: *Oct. 14, 2014

(54) COMMUNICATION SYSTEM, TRANSMITTER, RECEIVER, COMMUNICATION METHOD, PROGRAM, AND COMMUNICATION CABLE

(75) Inventors: Yasuhisa Nakajima, Kanagawa (JP); Hidekazu Kikuchi, Kanagawa (JP)

(73) Assignee: Sony Corporation (JP)

( * ) Notice: Subject to any disclaimer, the term of this patent is extended or adjusted under 35 U.S.C. 154(b) by 58 days.

This patent is subject to a terminal disclaimer.

(21) Appl. No.: 13/546,133

(22) Filed: Jul. 11, 2012

(65) Prior Publication Data

US 2012/0278832 A1 Nov. 1, 2012

Related U.S. Application Data

(60) Division of application No. 12/794,115, filed on Jun. 4, 2010, now Pat. No. 8,243,204, which is a continuation of application No. 12/312,428, filed as application No. PCT/JP2007/071600 on Nov. 7, 2007, now Pat. No. 7,936,401.

(30) Foreign Application Priority Data

Nov. 7, 2006 (JP) .............................. P2006-301486
Feb. 28, 2007 (JP) .............................. P2007-050426

(51) Int. Cl.
*H04N 5/44* (2011.01)
*H04N 5/38* (2006.01)
*H04N 7/16* (2011.01)
*H04N 21/436* (2011.01)
*H04N 21/41* (2011.01)
*H04N 21/4363* (2011.01)
*H04N 5/775* (2006.01)

(52) U.S. Cl.
CPC ............... *H04N 5/775* (2013.01); *H04N 7/163* (2013.01); *H04N 21/43615* (2013.01); *H04N 21/4122* (2013.01); *H04N 21/43632* (2013.01)
USPC ............ 348/725; 348/723; 348/705; 348/467

(58) Field of Classification Search
USPC ......... 348/723, 725–726, 467–468, 500, 705, 348/706, 553–555, 558, 736; 710/15, 68, 710/17, 18
IPC ................................................. H04N 5/38,5/44
See application file for complete search history.

(56) References Cited

U.S. PATENT DOCUMENTS 4,697,099 A 9/1987 Bonaccio
5,068,642 A 11/1991 Hruby et al.
(Continued)

FOREIGN PATENT DOCUMENTS

JP 62-75653 U 5/1987
JP 02-206249 A 8/1990
(Continued)

OTHER PUBLICATIONS

Office Action from Japanese Application No. 2008-543113, dated Jan. 8, 2013.

(Continued)

*Primary Examiner* — Trang U Tran
(74) *Attorney, Agent, or Firm* — Lerner, David, Littenberg, Krumoholz & Mentlik, LLP

(57) ABSTRACT

The present invention relates to a communication system, a transmitter, a receiver, a communication method, a program, and a communication cable for providing high-speed bidirectional communication while maintaining compatibility. When an HDMI® source performs bidirectional IP communication with an HDMI® sink using a CEC line and a signal line, a switching control unit controls a switch so that, when data is transmitted, the switch selects a constituent signal forming a differential signal output from a converting unit and, when data is transmitted, the switch selects a constituent signal forming a differential signal output from a receiver. When bidirectional communication is performed using only the CEC line, the switching control unit controls the switch so that the CEC signal output from the HDMI® source or the receiver is selected. The present invention is applicable to, for example, HDMI®.

8 Claims, 20 Drawing Sheets

(56) References Cited

U.S. PATENT DOCUMENTS

| | | | |
|---|---|---|---|
| 5,079,764 A | 1/1992 | Orita et al. | |
| 5,666,302 A | 9/1997 | Tanaka et al. | |
| 5,719,856 A | 2/1998 | May | |
| 6,169,475 B1 | 1/2001 | Browning | |
| 7,106,235 B1 | 9/2006 | Yen et al. | |
| 7,449,462 B2 | 11/2008 | Bryans et al. | |
| 7,468,755 B2 | 12/2008 | Ando | |
| 7,574,494 B1 | 8/2009 | Mayernick et al. | |
| 7,631,064 B1 * | 12/2009 | Gray | 709/224 |
| 7,835,386 B2 | 11/2010 | Binder | |
| 8,117,330 B2 | 2/2012 | Mukaide et al. | |
| 8,271,698 B2 * | 9/2012 | Nakajima et al. | 710/15 |
| 8,478,914 B2 * | 7/2013 | Sato et al. | 710/68 |
| 2003/0048851 A1 | 3/2003 | Hwang et al. | |
| 2004/0218598 A1 | 11/2004 | Kobayashi | |
| 2005/0028211 A1 | 2/2005 | Mochizuki et al. | |
| 2005/0182876 A1 | 8/2005 | Kim et al. | |
| 2006/0001777 A1 | 1/2006 | Araki | |
| 2006/0095401 A1 | 5/2006 | Krikorian et al. | |
| 2006/0140221 A1 | 6/2006 | Yamada et al. | |
| 2006/0209880 A1 | 9/2006 | Chang et al. | |
| 2006/0209892 A1 | 9/2006 | MacMullan et al. | |
| 2006/0256239 A1 | 11/2006 | Higashi | |

FOREIGN PATENT DOCUMENTS

| | | |
|---|---|---|
| JP | 09-153886 A | 6/1997 |
| JP | 2001057567 A | 2/2001 |
| JP | 2001-320479 A | 11/2001 |
| JP | 2002-319855 A | 10/2002 |
| JP | 2003158724 A | 5/2003 |
| JP | 2004-005283 A | 1/2004 |
| JP | 2004254027 A | 9/2004 |
| JP | 2004294437 A | 10/2004 |
| JP | 2004356752 A | 12/2004 |
| JP | 2005-018312 A | 1/2005 |
| JP | 2005-057714 A | 3/2005 |
| JP | 2005135433 A | 5/2005 |
| JP | 2005143033 A | 6/2005 |
| JP | 2005-284672 A | 10/2005 |
| JP | 2006-019948 A | 1/2006 |
| JP | 2006-107292 A | 4/2006 |
| JP | 2006-140776 A | 6/2006 |
| JP | 2006191161 A | 7/2006 |
| JP | 2006203800 A | 8/2006 |
| JP | 2006245949 A | 9/2006 |
| JP | 2006-295822 A | 10/2006 |
| JP | 2007-311884 A | 11/2007 |
| JP | 04-245817 B2 | 4/2009 |
| WO | 2005-064982 A1 | 7/2005 |
| WO | 2006-057324 A1 | 6/2006 |
| WO | 2006113858 A2 | 10/2006 |

OTHER PUBLICATIONS

Office Action from Japanese Application No. 2008-543107, dated Mar. 19, 2013.

IEEE Standard for Information Technology Telecommunications, Supplement to Carrier Sense Multiple Access with Collision Detection (CSMA/CD)Access Method and Physical Layer Specifications. Physical Layer Parameters and Specifications for 1000 Mb/s Operation Over 4-Pair of Category 5. Balanced Copper Cabling, Type 1000 BASE-T.

Communication pursuant to Article 94 (3) EPC, from European Application No. 07831380.6-2202, dated Jun. 18, 2012.

Communication pursuant to Article 94 (3) EPC, from European Application No. 07831382.2-2202, dated Jun. 21, 2012.

"High-Definition Multimedia Interface Specification Version 1.3". Internet Citation, Jun. 22, 2006, XP002391813, Retrieved from the Internet: URL:http://www.hdmi.org/download/HDMI_Spec_1.3_GM1.pdf [retrieved on Jul. 24, 2006].

Office Action from Japanese Application No. 2008-543113, dated Jul. 10, 2012.

"High-Definition Multimedia Interface Specification Version 1.1", May 20, 2004, pp. 10-42, Physical Layer.

Supplementary Partial European Search Report EP 07831331, dated Feb. 4, 2011.

Office Action from Japanese Application No. 2008-543106, dated Apr. 17, 2012.

Office Action from Japanese Application No. 2012-223329, dated Sep. 24, 2013.

Office Action from Korean Application No. 10-2009-7006203, dated Sep. 12, 2013.

Office Action from Japanese Application No. 2008-543112, dated Nov. 27, 2012.

Office Action from Japanese Application No. 2008-543096, dated Nov. 22, 2012.

Office Action from Korean Application No. 10-2009-7006504, dated Nov. 14, 2013.

Summons to attend oral proceedings pursuant to Rule 115 (1) EPC, from EP Application No. 07831331.9, dated Jul. 3, 2014.

* cited by examiner

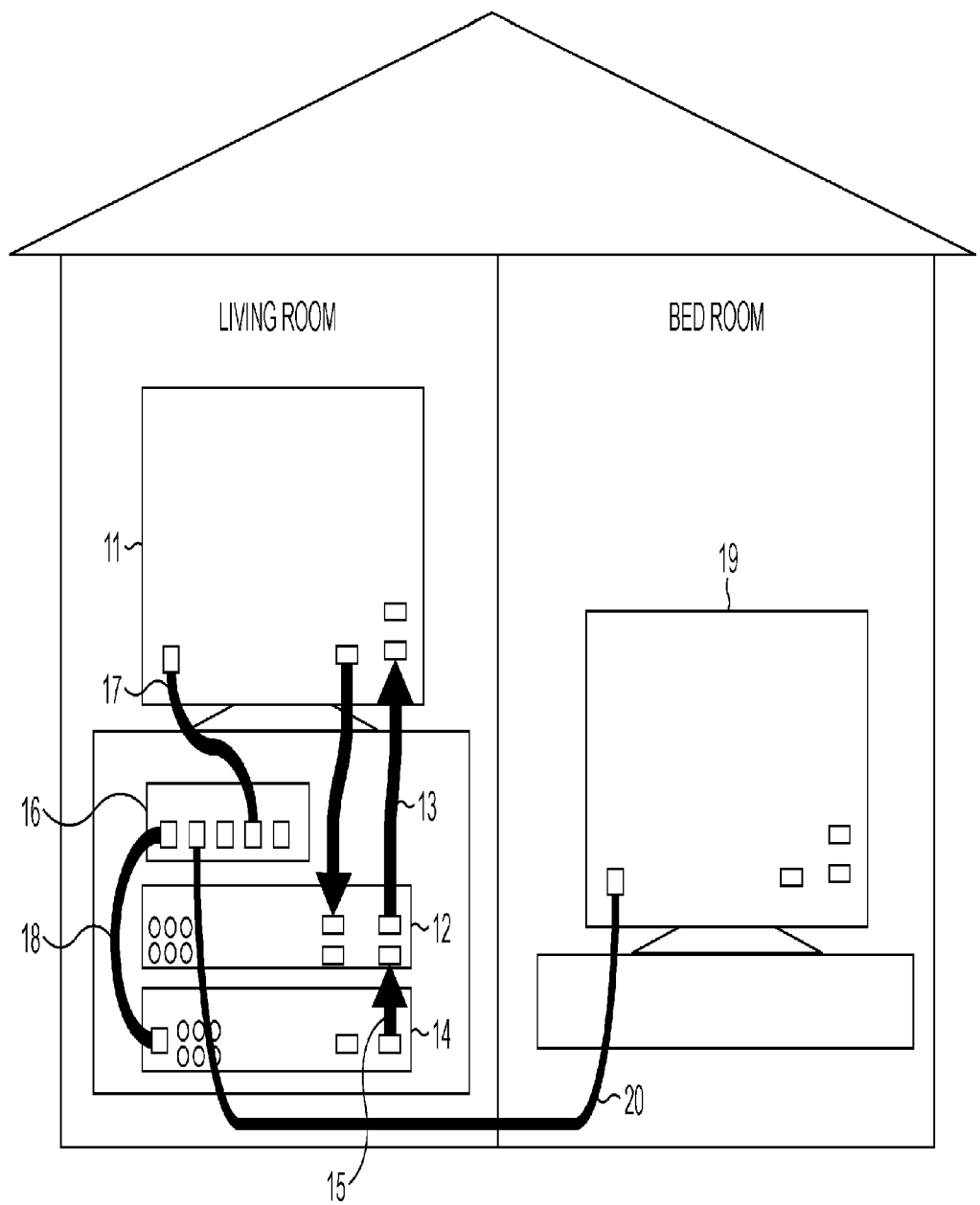

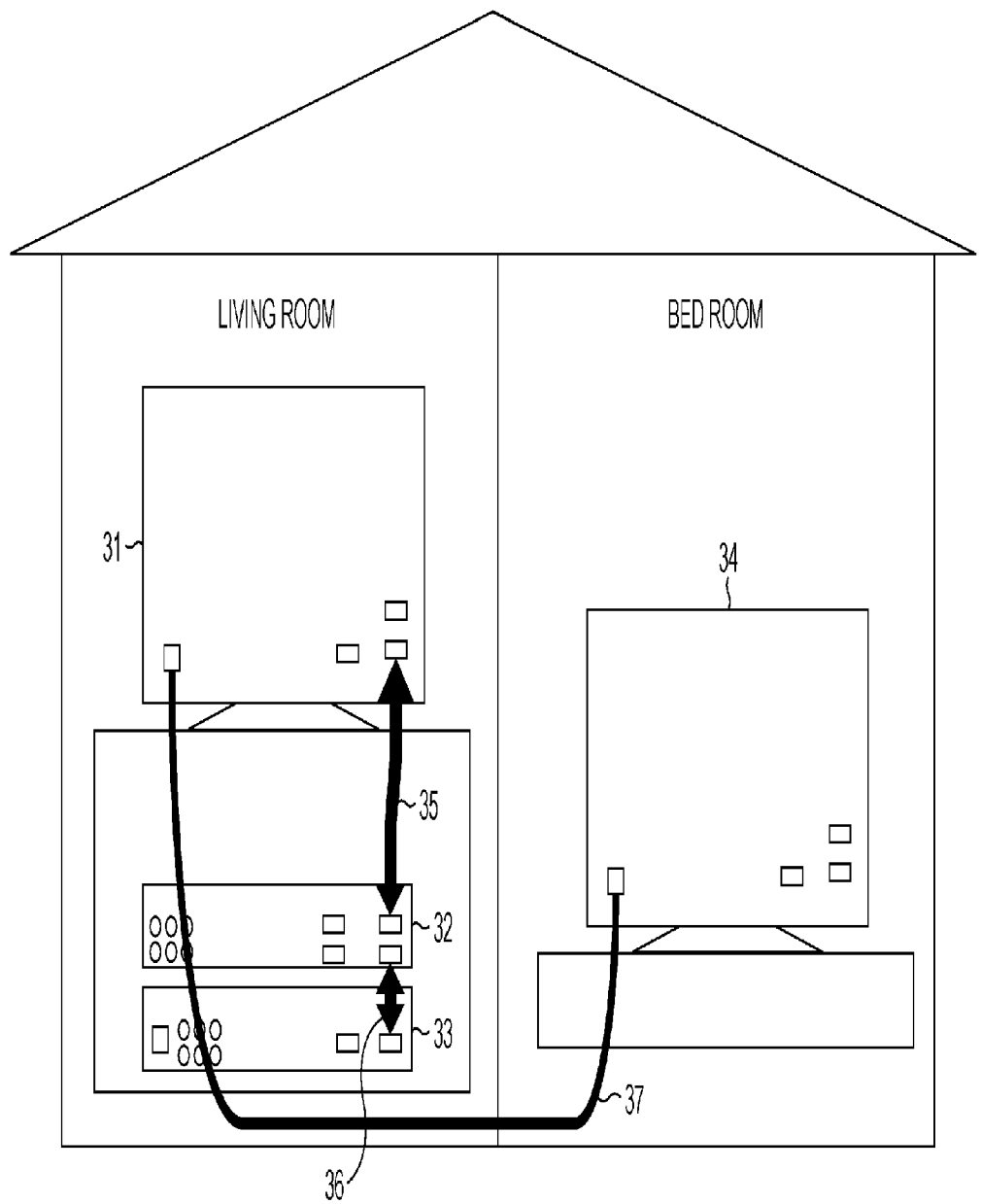

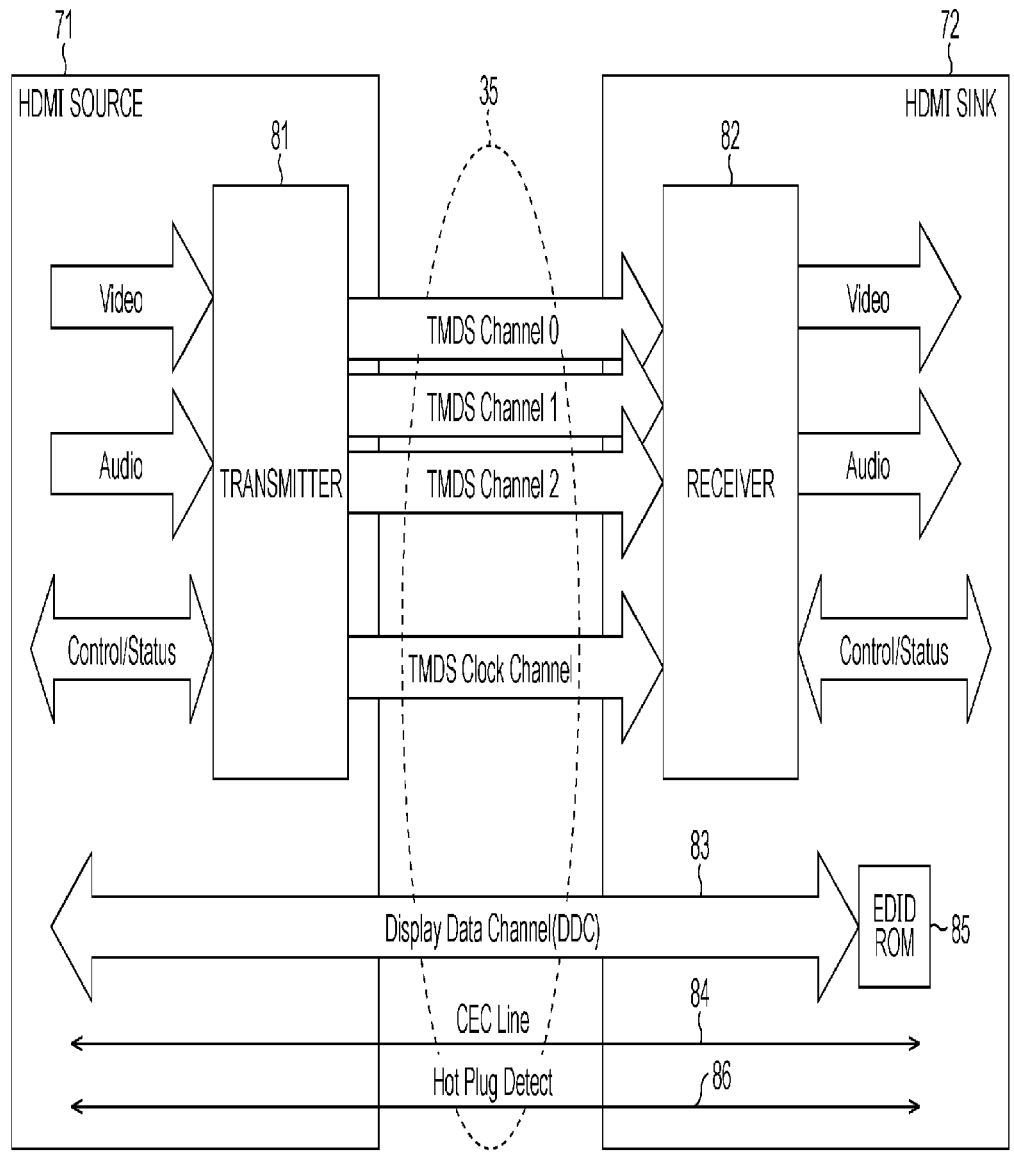

FIG. 4

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved(N.C. on device) |
| 15 | SCL | 16 | SDA |
| 17 | DDC/CEC Ground | 18 | +5V Power |
| 19 | Hot Plug Detect | | |

HDMI PIN ASSIGNMENT (Type-A)

FIG. 5

| PIN | Signal Assignment | PIN | Signal Assignment |
|---|---|---|---|
| 1 | TMDS Data2 Shield | 2 | TMDS Data2+ |
| 3 | TMDS Data2− | 4 | TMDS Data1 Shield |
| 5 | TMDS Data1+ | 6 | TMDS Data1− |
| 7 | TMDS Data0 Shield | 8 | TMDS Data0+ |
| 9 | TMDS Data0− | 10 | TMDS Clock Shield |
| 11 | TMDS Clock+ | 12 | TMDS Clock− |
| 13 | DDC/CEC Ground | 14 | CEC |
| 15 | SCL | 16 | SDA |
| 17 | Reserved | 18 | +5V Power |
| 19 | Hot Plug Detect | | |

HDMI PIN ASSIGNMENT (Type-C)

FIG. 9

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | | DVI-Dual |
| 7 | Max_TMDS_Clock | | | | | | | |
| 8 | Latency | | Full Duplex | Half Duplex | Reserved (0) | | | |
| 9 | Video Latency | | | | | | | |
| 10 | Audio Latency | | | | | | | |
| 11 | Interlaced Video Latency | | | | | | | |
| 12 | Interlaced Audio Latency | | | | | | | |
| 13...N | Reserved (0) | | | | | | | |

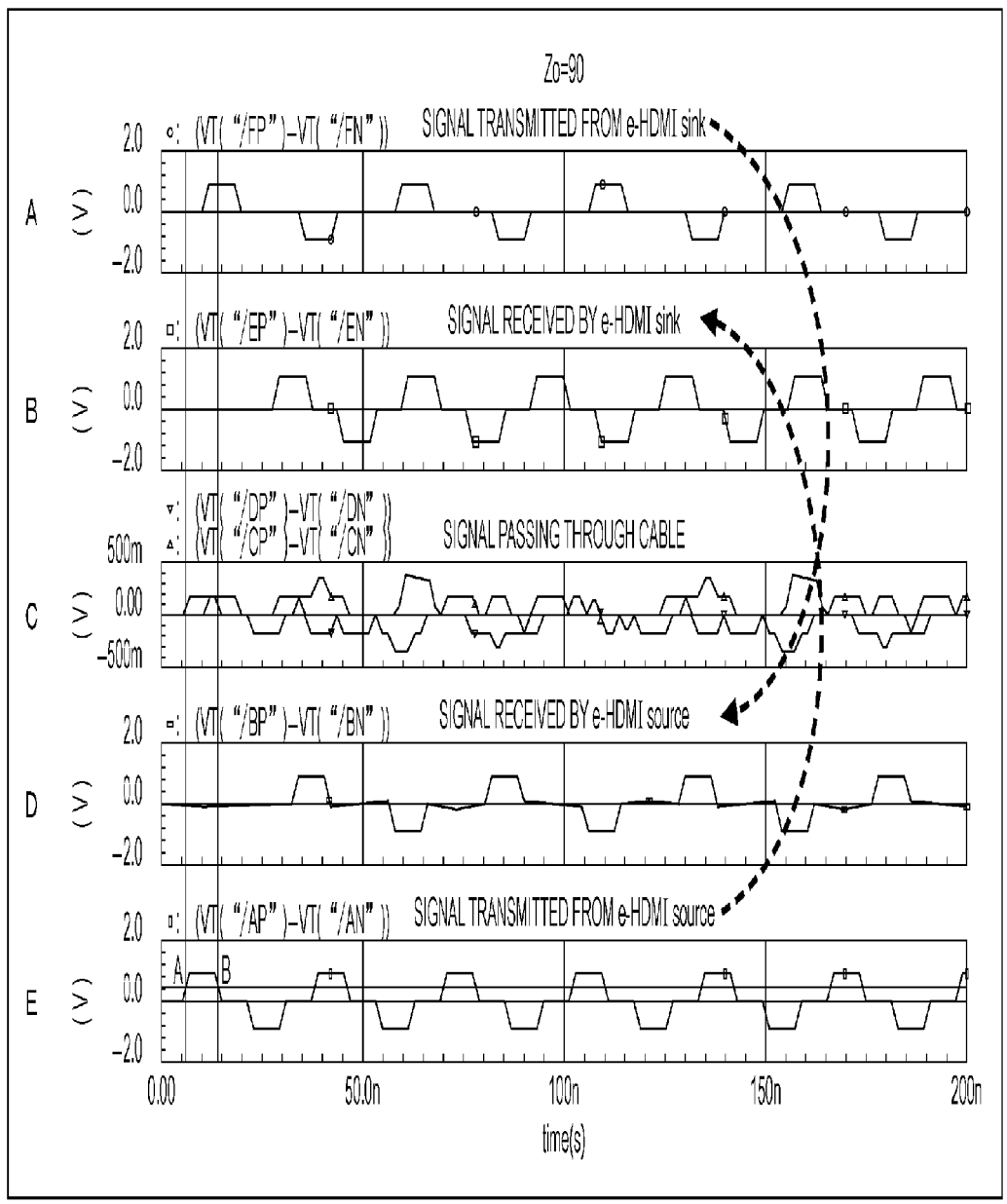

COMMUNICATION SYSTEM, TRANSMITTER, RECEIVER, COMMUNICATION METHOD, PROGRAM, AND COMMUNICATION CABLE

CROSS-REFERENCES TO RELATED APPLICATIONS

This application is a divisional of U.S. patent application Ser. No. 12/794,115, filed on Jun. 4, 2010, which issued on Aug. 14, 2012 as U.S. Pat. No. 8,243,204, which is a continuation of U.S. application Ser. No. 12/312,428, filed on Dec. 31, 2009, which issued on May 3, 2011 as U.S. Pat. No. 7,936,401, which is a national phase entry under 35 U.S.C. §371 of International Application No. PCT/JP2007/071600 filed Nov. 7, 2007, published on May 15, 2008 as WO 2008/056686 A1, which claims priority from Japanese Patent Application No. JP 2006-301486, filed in the Japanese Patent Office on Nov. 7, 2006 and from Japanese Patent Application No. JP 2007-050426, filed in the Japanese Patent Office on Feb. 28, 2007, the entire disclosures of which are incorporated herein by reference.

TECHNICAL FIELD

The present invention relates to a communication system, a transmitter, a receiver, a communication method, a program, and a communication cable and, in particular, to a communication system, a transmitter, a receiver, a communication method, a program, and a communication cable that provide high speed communication and that have compatibility with a communication interface capable of unidirectional high-speed transmission of pixel data of uncompressed images, such as High Definition Multimedia Interface (HDMI)®.

BACKGROUND ART

In recent years, HDMI® has been in widespread use as a high-speed communication interface for transmitting at high speed a digital television signal, i.e., pixel data of uncompressed (baseband) images and audio data associated with the images, for example, from a digital versatile disc (DVD) recorder, a set-top box, or other audio visual (AV) sources to a television set, a projector, or other displays.

The HDMI specification defines Transition Minimized Differential Signaling (TMDS) channel for high speed unidirectional transmission of pixel data and audio data from an HDMI® source to an HDMI® sink and Consumer Electronics Control line (CEC line) for bidirectional communication between an HDMI® source and an HDMI® sink, and the like.

For example, as shown in FIG. 1, pixel data and audio data can be transmitted at high speed by connecting a digital television set 11 to an AV amplifier 12 using an HDMI® cable 13 that complies with the HDMI® specification.

The digital television set 11 and AV amplifier 12 and a reproducing apparatus 14 are placed in a living room of a user house. In FIG. 1, the living room is located on the left side. The digital television set 11 is connected to the AV amplifier 12 using the HDMI® cable 13. The AV amplifier 12 is connected to the reproducing apparatus 14 using an HDMI® cable 15.

In addition, a hub 16 is placed in the living room. The digital television set 11 and reproducing apparatus 14 are connected to the hub 16 using local area network (LAN) cables 17 and 18, respectively. In a bedroom located to the right of the living room in the drawing, a digital television set 19 is placed. The digital television set 19 is connected to the hub 16 via a LAN cable 20.

For example, when content recorded in the reproducing apparatus 14 is played back and an image is displaying on the digital television set 11, the reproducing apparatus 14 decodes pixel data and audio data serving as the playback content. Thereafter, the reproducing apparatus 14 supplies the decoded uncompressed pixel data and audio data to the digital television set 11 via the HDMI® cable 15, the AV amplifier 12, and the HDMI® cable 13. On the basis of the pixel data and audio data supplied from the reproducing apparatus 14, the digital television set 11 displays images and outputs sounds.

When content recorded in the reproducing apparatus 14 is played back and images are displayed on the digital television sets 11 and 19 at the same time, the reproducing apparatus 14 supplies compressed pixel data and audio data serving as the content to be played back to the digital television set 11 via the LAN cable 18, the hub 16, and the LAN cable 17. In addition, the reproducing apparatus 14 supplies the compressed pixel data and audio data to the digital television set 19 via the LAN cable 18, the hub 16, and the LAN cable 20.

The digital television sets 11 and 19 decode the pixel data and audio data supplied from the reproducing apparatus 14, display images, and output sounds on the basis of the decoded uncompressed pixel data and audio data.

When the digital television set 11 receives pixel data and audio data for playing back a program over television broadcasting and if the received audio data is audio data of, for example, 5.1-channel surround sounds which the digital television set 11 is unable to decode, the digital television set 11 converts the audio data into an optical signal and transmits the optical signal to the AV amplifier 12.

Upon receiving the optical signal transmitted from the digital television set 11, the AV amplifier 12 photoelectrically converts the optical signal into audio data. Thereafter, the AV amplifier 12 decodes the converted audio data. Subsequently, the AV amplifier 12 amplifies the decoded uncompressed audio data when necessary so as to output sounds from surround speakers connected thereto. In this manner, the digital television set 11 can play back a 5.1-channel surround television program by decoding the received pixel data and displaying images by using the decoded pixel data and by outputting sounds from the AV amplifier 12 in accordance with the audio data supplied to the AV amplifier 12.

In addition, an HDMI®-based apparatus has been proposed in which, when pixel data and audio data are transmitted from an HDMI® source to an HDMI® sink, unnecessary data is muted by turning on/off the data transmission (refer to, for example, Patent Document 1).

Furthermore, an HDMI®-based apparatus has been proposed in which, by using a selector switch and selecting a terminal from which the pixel data and audio data are output, an HDMI® source can output pixel data and audio data to a desired HDMI® sink among a plurality of HDMI® sinks without changing cable connection between the HDMI® source and the HDMI® sink (refer to, for example, Patent Document 2).

Patent Document 1: Japanese Unexamined Patent Application Publication No. 2005-57714
Patent Document 2: Japanese Unexamined Patent Application Publication No. 2006-19948

DISCLOSURE OF INVENTION

Technical Problem

As noted above, using HDMI®, pixel data and audio data can be transmitted unidirectionally at high speed from an HDMI® source to an HDMI® sink. In addition, bidirectional communication can be performed between an HDMI® source and an HDMI® sink.

However, a transmission rate of bidirectional communication allowed by current HDMI® is about several hundred bps. Therefore, high-speed bidirectional communication, such as bidirectional Internet protocol (IP) communication, cannot be performed between an HDMI® source and an HDMI® sink.

Accordingly, when apparatuses including the apparatus described in Patent Documents 1 and 2 perform bidirectional IP communication using HDMI®, an amount of data transmitted over IP communication is limited. If a large amount of data is transmitted over IP communication, long delay times occur with communication. It is therefore difficult to use HDMI®, for example, in an application requiring bidirectional transmission of a large amount of data, such as compressed images, or in an application requiring a high speed response.

Accordingly, for example, pins dedicated to high-speed bidirectional IP communication may be provided to connectors of an HDMI® source and an HDMI® sink, and high-speed bidirectional IP communication may be performed using the dedicated pins.

However, if the dedicated pins are provided to current HDMI®-based connectors, compatibility with existing HDMI® cannot be maintained.

Accordingly, the present invention provides a high-speed bidirectional communication interface having compatibility with a communication interface capable of unidirectionally transmitting pixel data of uncompressed images at high speed (e.g., HDMI®).

Technical Solution

According to a first aspect of the present invention, a communication system includes a transmitter for unidirectionally transmitting, to a receiver using a first differential signal, pixel data of an uncompressed image of one screen during an effective video period representing a period from one vertical synchronization signal to the next vertical synchronization signal excluding horizontal blanking intervals and a vertical blanking interval, and the receiver for receiving the first differential signal transmitted from the transmitter. The transmitter includes first converting means for converting transmission data different from the pixel data into a second differential signal formed from a first constituent signal and a second constituent signal, transmitting the first constituent signal to the receiver via a first signal line, and outputting the second constituent signal, first selecting means for selecting one of a transmission signal related to a control operation and the second constituent signal output from the first converting means and transmitting the selected signal to the receiver via a second signal line, first control means for performing control so that, when the transmission signal is transmitted to the receiver, the transmission signal is selected by the first selecting means and, when the second differential signal is transmitted to the receiver, the second constituent signal is selected by the first selecting means, and first decoding means for receiving a third differential signal transmitted from the receiver and decoding the third differential signal into original data. The receiver includes second converting means for converting transmission data different from the pixel data into the third differential signal and transmitting the third differential signal to the transmitter, second decoding means for receiving the second differential signal transmitted from the transmitter and decoding the second differential signal into original data, second selecting means for selecting one of the transmission signal and the second constituent signal, and second control means for performing control so that, when the transmission signal is received, the transmission signal is selected and received by the second selecting means and, when the second differential signal is received, the second constituent signal is selected by the second selecting means and the second constituent signal is received by the second decoding means.

According to the first aspect of the present invention, a communication method for use in a communication system including a transmitter and a receiver is provided. The transmitter unidirectionally transmits, to the receiver using a first differential signal, pixel data of an uncompressed image of one screen during an effective video period representing a period from one vertical synchronization signal to the next vertical synchronization signal excluding horizontal blanking intervals and a vertical blanking interval, and the receiver receives the first differential signal transmitted from the transmitter. The transmitter includes first converting means for converting transmission data different from the pixel data into a second differential signal formed from a first constituent signal and a second constituent signal, transmitting the first constituent signal to the receiver via a first signal line, and outputting the second constituent signal, first selecting means for selecting one of a transmission signal related to a control operation and the second constituent signal output from the first converting means and transmitting the selected signal to the receiver via a second signal line, and first decoding means for receiving a third differential signal transmitted from the receiver and decoding the third differential signal into original data. The receiver includes second converting means for converting transmission data different from the pixel data into the third differential signal and transmitting the third differential signal to the transmitter, second decoding means for receiving the second differential signal transmitted from the transmitter and decoding the second differential signal into original data, and second selecting means for selecting one of the transmission signal and the second constituent signal. The method includes the steps of performing control so that, when the transmission signal is transmitted to the receiver, the transmission signal is selected by the first selecting means and, when the second differential signal is transmitted to the receiver, the second constituent signal is selected by the first selecting means, and performing control so that, when the transmission signal is received by the receiver, the transmission signal is selected and received by the second selecting means and, when the second differential signal is received by the receiver, the second constituent signal is selected by the second selecting means and the second constituent signal is received by the second decoding means.

According to the first aspect of the present invention, in the transmitter, the transmission data different from the pixel data is converted into the second differential signal formed from the first constituent signal and second constituent signal, the first constituent signal is transmitted to the receiver via the first signal line, the second constituent signal is output, one of the transmission signal related to a control operation and the output second constituent signal is selected, and the selected signal is transmitted to the receiver via the second signal line. Here, control is performed so that, when the transmission signal is transmitted to the receiver, the transmission signal is selected and, when the second differential signal is transmitted to the receiver, the second constituent signal is selected. In addition, the third differential signal transmitted from the receiver is received and decoded into the original data.

In contrast, in the receiver, the transmission data different from the pixel data is converted into the third differential signal, and the third differential signal is transmitted to the transmitter, the second differential signal transmitted from the transmitter is received and decoded into the original data, and one of the transmission signal and the second constituent signal is selected. Here, control is performed so that, when the transmission signal is received, the transmission signal is selected and received and, when the second differential signal is received, the second constituent signal is selected and received.

According to a second aspect of the present invention, a transmitter is provided. The transmitter unidirectionally transmits, to a receiver using a first differential signal, pixel data of an uncompressed image of one screen during an effective video period representing a period from one vertical synchronization signal to the next vertical synchronization signal excluding horizontal blanking intervals and a vertical blanking interval. The transmitter includes converting means for converting transmission data different from the pixel data into a second differential signal formed from a first constituent signal and a second constituent signal, transmitting the first constituent signal to the receiver via a first signal line, and outputting the second constituent signal, first selecting means for selecting one of a first transmission signal related to a control operation and the second constituent signal output from the first converting means and transmitting the selected signal to the receiver via a second signal line, first control means for performing control so that, when the first transmission signal is transmitted to the receiver, the first transmission signal is selected by the first selecting means and, when the second differential signal is transmitted to the receiver, the second constituent signal is selected by the first selecting means, and decoding means for receiving a third differential signal formed from a third constituent signal and a fourth constituent signal transmitted from the receiver and decoding the third differential signal into original data.

The decoding means can receive the third differential signal formed from the third constituent signal transmitted via the second signal line and the fourth constituent signal transmitted via the first signal line, the first selecting means can select one of the second constituent signal and the third constituent signal, or the first transmission signal and, when the third differential signal is received, the first control means can perform control so that the third constituent signal is selected by the first selecting means, and the third constituent signal is received by the decoding means.

The first selecting means can select one of the second constituent signal and the third constituent signal or one of the first transmission signal and a reception signal related to a control operation transmitted from the receiver via the second signal line. When the reception signal is selected, the first selecting means can receive and output the selected reception signal.

The decoding means can receive the third differential signal formed from the third constituent signal transmitted via a third signal line and the fourth constituent signal transmitted via a fourth signal line, and the transmitter can further include second selecting means for selecting one of the third constituent signal and a second transmission signal related to a control operation to be transmitted to the receiver, third selecting means for selecting one of the fourth constituent signal and a third transmission signal to be transmitted to the receiver, and second control means for performing control so that, when the second transmission signal and the third transmission signal are transmitted to the receiver, the second selecting means selects the second transmission signal and the second transmission signal is transmitted to the receiver via the third signal line, and the third selecting means selects the third transmission signal and the third transmission signal is transmitted to the receiver via the fourth signal line and, when the third differential signal is received, the second selecting means selects the third constituent signal so that the third constituent signal is received by the decoding means and the third selecting means selects the fourth constituent signal so that the fourth constituent signal is received by the decoding means.

The first selecting means can select one of the second constituent signal and one of the first transmission signal and a first reception signal related to a control operation and transmitted from the receiver via the second signal line. When the first reception signal is selected, the selected first reception signal can be received and output, and the second selecting means can select one of the third constituent signal and one of the second transmission signal and a second reception signal related to a control operation and transmitted from the receiver via the third signal line. When the second reception signal is selected, the selected second reception signal can be received and output.

The first transmission signal and the first reception signal can be CEC (Consumer Electronics Control) signals serving as control data for the transmitter or the receiver. The second reception signal can be E-EDID (Enhanced Extended Display Identification Data) serving as information regarding a performance of the receiver and used for a control operation, and data to be converted into the second differential signal and data obtained by decoding the third differential signal can be data that comply with Internet protocol (IP). The first control means can control the first selecting means so that the second constituent signal is selected after the second reception signal is received, and the second control means can control the second selecting means and the third selecting means so that the third constituent signal and the fourth constituent signal are selected after the second reception signal is received.

According to the second aspect of the present invention, a communication method for use in a transmitter or a program executed by a computer that controls the transmitter is provided. The transmitter unidirectionally transmits, to a receiver using a first differential signal, pixel data of an uncompressed image of one screen during an effective video period representing a period from one vertical synchronization signal to the next vertical synchronization signal excluding horizontal blanking intervals and a vertical blanking interval. The transmitter includes first converting means for converting transmission data different from the pixel data into a second differential signal formed from a first constituent signal and a second constituent signal, transmitting the first constituent signal to the receiver via a first signal line, and outputting the second constituent signal, selecting means for selecting one of a transmission signal related to a control operation and the second constituent signal output from the first converting means and transmitting the selected signal to the receiver via a second signal line, and decoding means for receiving a third differential signal transmitted from the receiver and decoding the third differential signal into original data. The method or program includes the step of performing control so that, when the transmission signal is transmitted to the receiver, the transmission signal is selected by the selecting means and, when the second differential signal is transmitted to the receiver, the second constituent signal is selected by the selecting means.

According to the second aspect of the present invention, the transmission data different from the pixel data is converted into the second differential signal formed from the first constituent signal and the second constituent signal, the first constituent signal is transmitted to the receiver via the first signal line, the second constituent signal is output. One of a first transmission signal related to a control operation and the output second constituent signal is selected, and the selected signal is transmitted to the receiver via the second signal line. Here, control is performed so that, when the first transmission signal is transmitted to the receiver, the first transmission signal is selected and, when the second differential signal is transmitted to the receiver, the second constituent signal is selected. In addition, the third differential signal formed from a third constituent signal and a fourth constituent signal transmitted from the receiver is received and decoded into the original data.

According to a third aspect of the present invention, a receiver is provided. The receiver receives, using a first differential signal, pixel data of an uncompressed image of one screen unidirectionally transmitted from a transmitter during an effective video period representing a period from one vertical synchronization signal to the next vertical synchronization signal excluding horizontal blanking intervals and a vertical blanking interval. The receiver includes decoding means for receiving a second differential signal formed from a first constituent signal transmitted from the transmitter via a first signal line and a second constituent signal transmitted from the transmitter via a second signal line and decoding the second differential signal to original data, first selecting means for selecting one of the first constituent signal and a first reception signal related to a control operation and transmitted from the transmitter via the first signal line, first control means for performing control so that, when the first reception signal is received, the first reception signal is selected and received by the first selecting means and, when the second differential signal is received, the first constituent signal is selected by the first selecting means and is received by the decoding means, and converting means for converting transmission data different from the pixel data into a third differential signal formed from a third constituent signal and a fourth constituent signal and transmitting the third differential signal to the transmitter.

The converting means can output the third constituent signal and transmit the fourth constituent signal to the transmitter via the second signal line. The first selecting means can select one of the first reception signal and one of the first constituent signal and the third constituent signal output from the converting means, and the first control means can perform control so that, when the third differential signal is transmitted, the first selecting means selects the third constituent signal, and the third constituent signal is transmitted to the transmitter via the first signal line.

The first selecting means can select one of the first constituent signal and the third constituent signal or one of the first reception signal and a transmission signal related to a control operation. When the transmission signal is selected, the selected transmission signal can be transmitted to the transmitter via the first signal line.

The converting means can output the third constituent signal and the fourth constituent signal, and the receiver can further include second selecting means for selecting one of the third constituent signal output from the converting means and a second reception signal related to a control operation and transmitted from the transmitter via a third signal line, third selecting means for selecting one of the fourth constituent signal output from the converting means and a third reception signal transmitted from the transmitter via a fourth signal line, and second control means for performing control so that, when the second reception signal and the third reception signal are received, the second reception signal is selected and received by the second selecting means, and the third reception signal is selected and received by the third selecting means and, when the third differential signal is transmitted, the third constituent signal is selected by the second selecting means and is transmitted to the transmitter via the third signal line, and the fourth constituent signal is selected by the third selecting means and is transmitted to the transmitter via the fourth signal line.

The first selecting means can select one of the first constituent signal and one of the first reception signal and a first transmission signal related to a control operation and to be transmitted to the transmitter. When the first transmission signal is selected, the selected first transmission signal can be transmitted to the transmitter via the first signal line, and the second selecting means can select one of the third constituent signal and one of the second reception signal and a second transmission signal related to a control operation and to be transmitted to the transmitter. When the second transmission signal is selected, the selected second transmission signal can be transmitted to the transmitter via the third signal line.

According to the third aspect of the present invention, a communication method for use in a receiver or a program executed by a computer that controls the receiver is provided. The receiver receives, using a first differential signal, pixel data of an uncompressed image of one screen unidirectionally transmitted from a transmitter during an effective video period representing a period from one vertical synchronization signal to the next vertical synchronization signal excluding horizontal blanking intervals and a vertical blanking interval. The receiver includes decoding means for receiving a second differential signal formed from a first constituent signal transmitted from the transmitter via a first signal line and a second constituent signal transmitted from the transmitter via a second signal line and decoding the second differential signal to original data, selecting means for selecting one of the first constituent signal and a reception signal related to a control operation and transmitted from the transmitter via the first signal line, and converting means for converting transmission data different from the pixel data into a third differential signal and transmitting the third differential signal to the transmitter. The method or the program includes the step of performing control so that, when the reception signal is received, the reception signal is selected by the selecting means and is received and, when the second differential signal is received, the first constituent signal is selected by the selecting means and is received by the decoding means.

According to the third aspect of the present invention, the second differential signal formed from the first constituent signal transmitted from the transmitter via the first signal line and the second constituent signal transmitted from the transmitter via the second signal line is received and decoded into the original data. One of the first constituent signal and the first reception signal related to a control operation and transmitted from the transmitter via the first signal line is selected. Here, control is performed so that, when the first reception signal is received, the first reception signal is selected and received and, when the second differential signal is received, the first constituent signal is selected and received. In addition, the transmission data different from the pixel data is converted into a third differential signal formed from a third constituent signal and a fourth constituent signal, and the third differential signal is transmitted to the transmitter.

According to a fourth aspect of the present invention, a communication cable for connecting between a transmitter and a receiver is provided. The transmitter unidirectionally transmits, using a first differential signal, pixel data of an uncompressed image of one screen to the receiver during an effective video period representing a period from one vertical synchronization signal to the next vertical synchronization signal excluding horizontal blanking intervals and a vertical blanking interval. The transmitter includes first converting means for converting transmission data different from the pixel data into a second differential signal formed from a first constituent signal and a second constituent signal, transmitting the first constituent signal to the receiver via a first signal line, and outputting the second constituent signal, first selecting means for selecting one of a transmission signal related to a control operation and the second constituent signal output from the first converting means and transmitting the selected signal to the receiver via a second signal line, first control means for performing control so that, when the transmission signal is transmitted to the receiver, the transmission signal is selected by the first selecting means and, when the second differential signal is transmitted to the receiver, the second constituent signal is selected by the first selecting means, and first decoding means for receiving a third differential signal transmitted from the receiver and decoding the third differential signal into original data. The receiver receives the first differential signal transmitted from the transmitter. The receiver includes second converting means for converting transmission data different from the pixel data into the third differential signal and transmitting the third differential signal to the transmitter, second decoding means for receiving the second differential signal transmitted from the transmitter and decoding the second differential signal to original data, second selecting means for selecting one of the second constituent signal and the transmission signal, and second control means for performing control so that, when the transmission signal is received, the transmission signal is selected by the second selecting means and is received and, when the second differential signal is received, the second constituent signal is selected by the second selecting means and is received by the second decoding means. The communication cable includes the first signal line and the second signal line. The first signal line and the second signal line are twisted together so as to form a twisted wire differential pair.

According to the fourth aspect of the present invention, the communication cable for connecting between the transmitter and the receiver includes a first signal line and a second signal line. The first signal line and the second signal line are twisted together so as to form a twisted wire differential pair.

According to a fifth aspect of the present invention, a communication system including an interface for performing transmission of video data and audio data, exchange and authentication of connected device information, communication of device control data, and LAN communication by using a single cable, the communication system is provided. The communication system includes a pair of differential transmission lines that allow a connectable device to be connected thereto. The LAN communication is performed through bidirectional communication via the pair of differential transmission lines, and the communication system has a function of notifying a connection state of the interface by using a DC bias potential of at least one of the differential transmission lines of the pair.

According to a sixth aspect of the present invention, a communication system including an interface for performing transmission of video data and audio data, exchange and authentication of connected device information, communication of device control data, and LAN communication, by using a single cable is provided. The communication system includes two pairs of differential transmission lines that allow a connectable device to be connected thereto. The LAN communication is performed through unidirectional communication via the two pairs of differential transmission lines. The communication system has a function of notifying a connection state of the interface by using a DC bias potential of at least one of the differential transmission lines, and at least two transmission lines are used for exchange and authentication of connected device information in a time multiplexing manner with the LAN communication.

Advantageous Effects

According to the present invention, bidirectional communication can be performed. In particular, high-speed bidirectional communication can be performed in, for example, a communication interface that can unidirectionally transmit pixel data of an uncompressed image and audio data associated with the image at high speed while maintaining compatibility.

In addition, according to the present invention, a circuit used for LAN communication can be formed regardless of the electrical specification defined for the DDC. As a result, stable and reliable LAN communication can be realized at low cost.

BRIEF DESCRIPTION OF DRAWINGS

FIG. 1 is a diagram illustrating the configuration of a widely used image transmission system.

FIG. 2 is a diagram illustrating the configuration of an image transmission system according to an embodiment of the present invention.

FIG. 3 is a diagram illustrating an example of the structure of an HDMI® source and an HDMI® sink.

FIG. 4 is a diagram illustrating the pin assignment of a connector of Type-A of HDMI®.

FIG. 5 is a diagram illustrating the pin assignment of a connector of Type-C of HDMI®.

FIG. 9 is a diagram illustrating the data structure of Vender Specific.

FIG. 21 is a diagram illustrating bidirectional communication waveforms in the communication system having the configuration examples.

EXPLANATION OF REFERENCE NUMERALS

Figure 6:
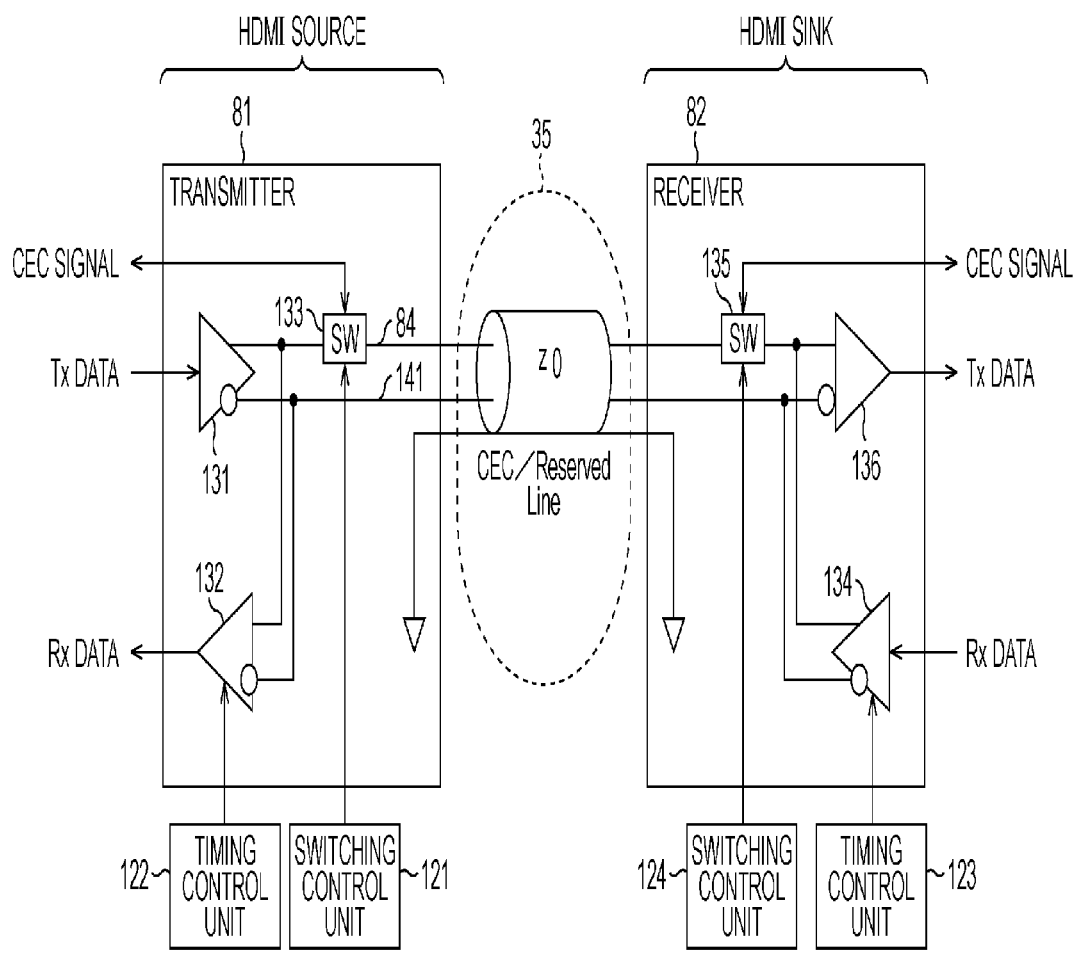
FIG. 6 is a diagram illustrating an example of the configuration of the HDMI® source and the HDMI® sink in more detail.

35 HDMI® cable, 71 HDMI® source, 72 HDMI® sink, 81 transmitter, 82 receiver, 83 DDC, 84 CEC line, 85 EDIDROM, 121 switching control unit, 124 switching control unit, 131 converting unit, 132 decoding unit, 133 switch, 134 converting unit, 135 switch, 136 decoding unit, 141 signal line, 171 switching control unit, 172 switching control unit, 181 switch, 182 switch, 183 decoding unit, 184 converting unit, 185 switch, 186 switch, 191 SDA line, 192 SCL line, 400 communication system, 401 LAN function expansion HDMI (EH) source device, 411 LAN signal transmitter circuit, 412 terminating resistor, 413, 414 AC coupling capacitor, 415 LAN signal receiver circuit, 416 subtracting circuit, 421 pull-up resistor, 422 resistor, 423 capacitor, 424 comparator, 431 pull-down resistor, 432 resistor, 433 capacitor, 434 comparator, 402 EH sink device, 441 LAN signal transmitter circuit, 442 terminating resistor, 443, 444 AC coupling capacitor, 445 LAN signal receiver circuit, 446 subtracting circuit, 451 pull-down resistor, 452 resistor, 453 capacitor, 454 comparator, 461 choke coil, 462, 463 resistor, 403 EH cable, 501 Reserved line, 502 HPD Line, 511, 512 source side terminal, 521, 522 sink side terminal, 600 communication system, 601 LAN function expansion HDMI (EH) source device, 611 LAN signal transmitter circuit, 612, 613 terminating resistor, 614-617 AC coupling capacitor, 618 LAN signal receiver circuit, 620 inverter, 621 resistor, 622 resistor, 623 capacitor, 624 comparator, 631 pull-down resistor, 632 resistor, 633 capacitor, 634 comparator, 640 NOR gate, 641-644 analog switch, 645 inverter, 646, 647 analog switch, 651, 652 DDC transceiver, 653, 654 pull-up resistor, 602 EH sink device, 661 LAN signal transmitter circuit, 662, 663 terminating resistor, 664-667 AC coupling capacitor, 668 LAN signal receiver circuit, 671 pull-down resistor, 672 resistor, 673 capacitor, 674 comparator, 681 choke coil, 682, 683 resistor, 691-694 analog switch, 695 inverter, 696, 697 analog switch, 701, 702 DDC transceiver, 703 pull-up resistor, 603 EH cable, 801 Reserved line, 802 HPD line, 803 SCL line, 804 SDA line, 811-814 source side terminal, 821-824 sink side terminal

BEST MODES FOR CARRYING OUT THE INVENTION

Exemplary embodiments of the present invention are described below with reference to the accompanying drawings.

FIG. 2 illustrates the configuration of an image transmission system according to an embodiment of the present invention.

The image transmission system includes a digital television set 31, an amplifier 32, a reproducing apparatus 33 and a digital television set 34. The digital television set 31 is connected to the amplifier 32 using an HDMI® cable 35 that complies with HDMI® requirements, and the amplifier 32 is connected to the reproducing apparatus 33 using an HDMI® cable 36 that complies with HDMI® requirements. In addition, the digital television set 31 is connected to the digital television set 34 using a LAN cable 37 for a LAN, such as the Ethernet (registered trademark).

In the example shown in FIG. 2, the digital television set 31, the amplifier 32, and the reproducing apparatus 33 are placed in a living room located on the left of FIG. 2, and the digital television set 34 is installed in a bedroom located to the right of the living room.

The reproducing apparatus 33 is, for example, a DVD player, a hard disc recorder or the like. The reproducing apparatus 33 decodes pixel data and audio data used for reproducing content, and supplies the resultant uncompressed pixel data and audio data to the amplifier 32 via the HDMI® cable 36.

The amplifier 32 may be composed of an AV amplifier. The amplifier 32 receives pixel data and audio data from the reproducing apparatus 33 and amplifies the supplied audio data as needed. In addition, the amplifier 32 supplies the audio data supplied from the reproducing apparatus 33 and amplified as needed and the pixel data supplied from the reproducing apparatus 33 to the digital television set 31 via the HDMI® cable 35. On the basis of the pixel data and audio data supplied from the amplifier 32, the digital television set 31 displays images and outputs sound so as to play back the content.

In addition, the digital television set 31 and the amplifier 32 can perform high-speed bidirectional communication, such as IP communication, by using the HDMI® cable 35, and the amplifier 32 and the reproducing apparatus can also perform high-speed bidirectional communication, such as IP communication, by using the HDMI® cable 36.

That is, for example, the reproducing apparatus 33 can transmit, to the amplifier 32, compressed pixel data and audio data as data that complies with IP standards via the HDMI® cable 36 by performing IP communication with the amplifier 32. The amplifier 32 can receive the compressed pixel data and audio data transmitted from the reproducing apparatus 33.

In addition, by performing IP communication with the digital television set 31, the amplifier 32 can transmit, to the digital television set 31, compressed pixel data and audio data as data that complies with IP via the HDMI® cable 35. The digital television set 31 can receive the compressed pixel data and audio data transmitted from the amplifier 32.

Thus, the digital television set 31 can transmit the received pixel data and audio data to the digital television set 34 via the LAN cable 37. In addition, the digital television set 31 decodes the received pixel data and audio data. Thereafter, on the basis of the resultant uncompressed pixel data and audio data, the digital television set 31 displays images and outputs sound so as to play back the content.

The digital television set 34 receives and decodes the pixel data and audio data transmitted from the digital television set 31 via the LAN cable 37. Thereafter, on the basis of the uncompressed pixel data and audio data obtained through the decoding, the digital television set 34 displays images and outputs sound so as to play back the content. In this manner, the digital television sets 31 and 34 can play back the same or different content items at the same time.

Furthermore, when the digital television set 31 receives pixel data and audio data for playing back a television broadcasting program serving as content and if the received audio data is audio data, such as 5.1-channel surround sound, that the digital television set 31 cannot decode, the digital television set 31 transmits the received audio data to the amplifier 32 via the HDMI® cable 35 by performing IP communication with the amplifier 32.

The amplifier 32 receives and decodes the audio data transmitted from the digital television set 31. Thereafter, the amplifier 32 amplifies the decoded audio data as needed so as to play back the 5.1-channel surround sound using speakers (not shown) connected to the amplifier 32.

The digital television set 31 transmits the audio data to the amplifier 32 via the HDMI® cable 35. In addition, the digital television set 31 decodes the received pixel data and plays back the program on the basis of the pixel data obtained through the decoding.

In this manner, in the image transmission system shown in FIG. 2, the electronic apparatuses, such as the digital television set 31, amplifier 32, and reproducing apparatus 33 connected using the HDMI® cables 35 and 36 can perform IP communication by using the HDMI® cables. Accordingly, a LAN cable corresponding to the LAN cable 17 shown in FIG. 1 is not needed.

In addition, by connecting the digital television set 31 to the digital television set 34 using the LAN cable 37, the digital television set 31 can further transmit data received from the reproducing apparatus 33 via the HDMI® cable 36, the amplifier 32, and the HDMI® cable 35 to the digital television set 34 via the LAN cable 37. Therefore, a LAN cable and an electronic apparatus respectively corresponding to the LAN cable 18 and the hub 16 shown in FIG. 1 are not needed.

As shown in FIG. 1, in existing image transmission systems, cables of different types are required in accordance with transmission/reception data and communication methods. Therefore, wiring of cables interconnecting electronic apparatuses is complicated. In contrast, in the image transmission system shown in FIG. 2, high-speed bidirectional communication, such as IP communication, can be performed between electronic apparatuses connected using the HDMI® cable. Accordingly, connection between electronic apparatuses can be simplified. That is, existing complicated wiring of cables for connecting electronic apparatuses can be further simplified.

Next, FIG. 3 illustrates an example of the configuration of an HDMI® source and an HDMI® sink incorporated in each of the electronic apparatuses connected to one another using an HDMI® cable, for example, the configuration of an HDMI® source provided in the amplifier 32 and an HDMI® sink provided in the digital television set 31 shown in FIG. 2.

An HDMI® source 71 is connected to an HDMI® sink 72 using the single HDMI® cable 35. High-speed bidirectional IP communication can be performed between the HDMI® source 71 and the HDMI® sink 72 by using the HDMI® cable 35 while maintaining compatibility with current HDMI®.

During an effective video period (hereinafter referred to as an "active video period" as needed), which is a period from one vertical synchronization signal to the next vertical synchronization signal excluding horizontal blanking intervals and a vertical blanking interval, the HDMI® source 71 unidirectionally transmits a differential signal corresponding to pixel data of an uncompressed image for one screen to the HDMI® sink 72 via a plurality of channels. In addition, during the horizontal blanking interval or vertical blanking interval, the HDMI® source 71 unidirectionally transmits differential signals corresponding to at least audio data and control data associated with the image, other auxiliary data and the like, to the HDMI® sink 72 via a plurality of channels.

That is, the HDMI® source 71 includes a transmitter 81. The transmitter 81 converts, for example, pixel data of an uncompressed image into a corresponding differential signal. Thereafter, the transmitter 81 unidirectionally and serially transmits the differential signal to the HDMI® sink 72 using three TMDS channels #0, #1 and #2 of the HDMI® cable 35.

In addition, the transmitter 81 converts audio data associated with uncompressed images, necessary control data, other auxiliary data and the like, into corresponding differential signals and unidirectionally and serially transmits the converted differential signals to the HDMI® sink 72 connected using the HDMI® cable 35 via the three TMDS channels #0, #1 and #2.

Furthermore, the transmitter 81 transmits, via a TMDS clock channel, a pixel clock that is synchronized with the pixel data to be transmitted via the three TMDS channels #0, #1 and #2, to the HDMI® sink 72 connected thereto using the HDMI® cable 35. 10-bit pixel data is transmitted via each TMDS channel #i (i=0, 1, or 2) during one pixel clock.

The HDMI® sink 72 receives the differential signal corresponding to the pixel data unidirectionally transmitted from the HDMI® source 71 via the plurality of channels during the active video period. In addition, the HDMI® sink receives the differential signals corresponding to the audio data and control data unidirectionally transmitted from the HDMI® source 71 via the plurality of channels during the horizontal blanking interval or the vertical blanking interval.

That is, the HDMI® sink 72 includes a receiver 82. The receiver 82 receives, via the TMDS channels #0, #1 and #2, the differential signal corresponding to the pixel data and the differential signals corresponding to the audio data and control data, which are unidirectionally transmitted from the HDMI® source 71 connected thereto using the HDMI® cable 35, in synchronization with the pixel clock also transmitted from the HDMI® source 71 via the TMDS clock channel.

In addition to the three TMDS channels #0 to #2 serving as transmission channels used for unidirectionally and serially transmitting the pixel data and audio data from the HDMI® source 71 to the HDMI® sink 72 in synchronization with the pixel clock and the TMDS clock channel serving as a transmission channel used for transmitting the pixel clock, the transmission channels of the HDMI® system including the HDMI® source 71 and HDMI® sink 72 include transmission channels called a display data channel (DDC) 83 and a CEC line 84.

The DDC 83 includes two signal lines (not shown) contained in the HDMI® cable 35. The DDC 83 is used when the HDMI® source 71 reads enhanced extended display identification data (E-EDID) from the HDMI® sink 72 connected thereto using the HDMI® cable 35.

That is, in addition to the receiver 82, the HDMI® sink 72 includes an EDIDROM (EDID ROM (read only memory)) 85 storing the E-EDID representing information on the settings and performance of the HDMI® sink 72. The HDMI® source 71 reads, via the DDC 83, the E-EDID stored in the EDIDROM 85 of the HDMI® sink 72 connected thereto using the HDMI® cable 35. Thereafter, on the basis of the E-EDID, the HDMI® source 71 recognizes the settings and performance of the HDMI® sink 72, i.e., for example, an image format (a profile) supported by the HDMI® sink 72 (an electronic apparatus including the HDMI® sink 72). Examples of the image format include RGB (red, green, blue), YCbCr 4:4:4, and YCbCr 4:2:2.

Although not shown, like the HDMI® sink 72, the HDMI® source 71 can store the E-EDID and transmit the E-EDID to the HDMI® sink 72 as needed.

The CEC line 84 includes one signal line (not shown) contained in the HDMI® cable 35. The CEC line 84 is used for bidirectional communication of the control data between the HDMI® source 71 and HDMI® sink 72.

The HDMI® source 71 and HDMI® sink 72 can perform bidirectional IP communication by transmitting a frame that complies with IEEE (Institute of Electrical and Electronics Engineers) 802.3 to the HDMI® sink 72 and HDMI® source 71, respectively, via the DDC 83 or the CEC line 84.

In addition, the HDMI® cable 35 includes a signal line 86 connected to a pin called Hot Plug Detect. By using this signal line 86, the HDMI® source 71 and the HDMI® sink 72 can detect connection of a new electronic apparatus, that is, the HDMI® sink 72 and the HDMI® source 71, respectively.

Next, FIGS. 4 and 5 illustrate the pin assignment of a connector (not shown) provided to the HDMI® source 71 or the HDMI® sink 72. The connector is connected to the HDMI® cable 35.

Note that, in FIGS. 4 and 5, a pin number for identifying each pin of the connector is shown in the left column (the PIN column), and the name of a signal assigned to the pin identified by the pin number shown in the left column at the same row is shown in the right column (the Signal Assignment column).

FIG. 4 illustrates the assignment of pins of a connector called Type-A of HDMI®.

Two differential signal lines used for transmitting differential signals TMDS Data#i+ and TMDS Data#i− of a TMDS channel #i are connected to pins (pins having pin numbers 1, 4 and 7) to which TMDS Data#i+ is assigned and pins (pins having pin numbers 3, 6 and 9) to which TMDS Data#i− is assigned.

In addition, the CEC line 84 for transmitting a CEC signal of control data is connected to a pin having a pin number of 13, and a pin having a pin number 14 is a reserved pin. If bidirectional IP communication can be performed by using this reserved pin, compatibility with current HDMI® can be maintained. Accordingly, in order for differential signals to be transmitted by using the CEC line 84 and a signal line to be connected to the pin having the pin number 14, the signal line to be connected to the pin having the pin number 14 and the CEC line 84 are twisted together so as to form a shielded twisted wire differential pair. In addition, the signal line and the CEC line 84 are ground to a ground line of the CEC line 84 and the DDC 83 connected to a pin having a pin number 17.

Furthermore, a signal line for transmitting a serial data (SDA) signal, such as the E-EDID, is connected to a pin having a pin number 16, and a signal line for transmitting a serial clock (SCL) signal, which is used for transmission/reception synchronization of the SDA signal, is connected to a pin having a pin number 15. The DDC 83 shown in FIG. 3 is composed of the signal line for transmitting the SDA signal and the signal line for transmitting the SCL signal.

Like the CEC line 84 and the signal line to be connected to the pin having the pin number 14, the signal line for transmitting the SDA signal and the signal line for transmitting the SCL signal are twisted together so as to form a shielded twisted wire differential pair and allow differential signals to pass therethrough. The signal line for transmitting the SDA signal and the signal line for transmitting the SCL signal are grounded to a ground line that is connected to the pin having the pin number 17.

In addition, the signal line 86 for transmitting a signal for detecting connection of a new electronic apparatus is connected to a pin having a pin number 19.

FIG. 5 illustrates the assignment of pins of a connector called Type-C or a mini-type of HDMI®.

Two signal lines serving as differential signal lines for transmitting differential signals TMDS Data#i+ and TMDS Data#i− of a TMDS channel #i are connected to pins (pins having pin numbers 2, 5 and 8) to which TMDS Data#i+ is assigned and pins (pins having pin numbers 3, 6 and 9) to which TMDS Data#i− is assigned.

In addition, the CEC line 84 for transmitting a CEC signal is connected to a pin having a pin number of 14, and a pin having a pin number of 17 is a reserved pin. As in the case of Type-A, the signal line to be connected to the pin having the pin number 17 and the CEC line 84 are twisted together so as to form a shielded twisted wire differential pair. The signal line and the CEC line 84 are grounded to the ground line of the CEC line 84 and DDC line 83 to be connected to a pin having a pin number 13.

Furthermore, a signal line for transmitting an SDA signal is connected to a pin having a pin number 16, while a signal line for transmitting an SCL signal is connected to a pin having a pin number 15. As in the case of Type-A, the signal line for transmitting the SDA signal and the signal line for transmitting the SCL signal are twisted together so as to form a shielded twisted wire differential pair and allow differential signals to pass therethrough. The signal line for transmitting the SDA signal and the signal line for transmitting the SCL signal are grounded to a ground line that is connected to the pin having the pin number 13. Still furthermore, the signal line 86 for transmitting a signal for detecting connection of a new electronic apparatus is connected to a pin having a pin number 19.

Next, FIG. 6 is a diagram illustrating the configuration of the HDMI® source 71 and HDMI® sink 72 for performing IP communication using a half duplex communication method via the CEC line 84 and the signal line connected to the reserved pin of the HDMI® connector. Note that FIG. 6 shows an example of the configuration regarding half duplex communication between the HDMI® source 71 and HDMI® sink 72. In addition, the same numbering will be used in describing FIG. 6 as was used in describing FIG. 3, and the description thereof are not repeated where appropriate.

The HDMI® source 71 includes the transmitter 81, a switching control unit 121 and a timing control unit 122. In addition, the transmitter 81 includes a converting unit 131, a decoding unit 132, and a switch 133.

The converting unit 131 receives Tx data supplied thereto. The Tx data is data to be transmitted from the HDMI® source 71 to the HDMI® sink 72 through bidirectional IP communication between the HDMI® source 71 and the HDMI® sink 72. For example, the Tx data is compressed pixel data and audio data and the like.

The converting unit 131 includes, for example, a differential amplifier. The converting unit 131 converts the supplied Tx data into a differential signal having two constituent signals. In addition, the converting unit 131 transmits the converted differential signal to the receiver 82 via the CEC line 84 and a signal line 141 connected to a reserved pin of a connector (not shown) provided to the transceiver 81. That is, the converting unit 131 supplies one of the constituent signals forming the converted differential signal to the switch 133 via the CEC line 84, more precisely, via the signal line of the transmitter 81 connected to the CEC line 84 of the HDMI® cable 35. The converting unit 131 further supplies the other constituent signal of the converted differential signal to the receiver 82 via the signal line 141, more precisely, via the signal line of the transmitter 81 connected to the signal line 141 of the HDMI® cable 35.

The decoding unit 132 includes, for example, a differential amplifier. Input terminals of the decoding unit 132 are connected to the CEC line 84 and the signal line 141. Under the control of the timing control unit 122, the decoding unit 132 receives a differential signal transmitted from the receiver 82 via the CEC line 84 and the signal line 141, that is, the differential signal including the constituent signal on the CEC line 84 and the constituent signal on the signal line 141. The decoding unit 132 then decodes the differential signal and outputs original Rx data. As used herein, the term "Rx data" refers to data transmitted from the HDMI® sink 71 to the HDMI® source 71 through bidirectional IP communication between the HDMI® source 71 and the HDMI® sink 72. An example of the Rx data is a command for requesting transmission of pixel data and audio data, or the like.

At a timing point when data is transmitted, the switch 133 is supplied with the CEC signal from the HDMI® source 71 or the constituent signal of the differential signal corresponding to Tx data from the converting unit 131, while, at a timing point when data is received, the switch 133 is supplied with the CEC signal from the receiver 82 or the constituent signal of the differential signal corresponding to Rx data from the receiver 82. Under the control of the switching control unit 121, the switch 133 selectively outputs the CEC signal from the HDMI® source 71, the CEC signal from the receiver 82, the constituent signal of the differential signal corresponding to Tx data, or the constituent signal of the differential signal corresponding to Rx data.

That is, at a timing point when the HDMI® source 71 transmits data to the HDMI® sink 72, the switch 133 selects one of the CEC signal supplied from HDMI® source 71 and the constituent signal supplied from the converting unit 131 and transmits the selected one of the CEC signal and the constituent signal to the receiver 82 via the CEC line 84.

In addition, at a timing point when the HDMI® source 71 receives data from the HDMI® sink 72, the switch 133 receives one of the CEC signal transmitted from the receiver 82 via the CEC line 84 and the constituent signal of the differential signal corresponding to the Rx data. The switch 133 then supplies the received CEC signal or constituent signal to the HDMI® source 71 or the decoding unit 132.

The switching control unit 121 controls the switch 133 so that the switch 133 is switched to select one of the signals supplied to the switch 133. The timing control unit 122 controls a timing point at which the decoding unit 132 receives the differential signal.

In addition, the HDMI® sink 72 includes the receiver 82, a timing control unit 123, and a switching control unit 124. Furthermore, the receiver 82 includes a converting unit 134, a switch 135, and a decoding unit 136.

The converting unit 134 is composed of, for example, a differential amplifier. The converting unit 134 receives supplied Rx data. Under the control of the timing control unit 123, the converting unit 134 converts the supplied Rx data into a differential signal having two constituent signals and transmits the converted differential signal to the transmitter 81 via the CEC line 84 and signal line 141. That is, the converting unit 134 supplies one of the constituent signals forming the converted differential signal to the switch 135 via the CEC line 84, more precisely, via the signal line provided to the receiver 82 connected to the CEC line 84 of the HDMI® cable 35, while the converting unit 134 supplies the other constituent signal forming the converted differential signal to the transmitter 81 via the signal line 141, more precisely, via the signal line provided to the transmitter 81 connected to the signal line 141 of the HDMI® cable 35.

At a timing point when data is received, the switch 135 is supplied with the CEC signal from the transmitter 81 or the constituent signal forming the differential signal corresponding to Tx data from the transmitter 81, while, at a timing point when data is transmitted, the switch 135 is supplied with the constituent signal forming the differential signal corresponding to Rx data from the converting unit 134 or the CEC signal from the HDMI® sink 72. Under the control of the switching control unit 124, the switch 135 selectively outputs one of the CEC signal from the transmitter 81, the CEC signal from the HDMI® sink 72, the constituent signal forming the differential signal corresponding to Tx data, and the constituent signal forming the differential signal corresponding to Rx data.

That is, at a timing point when the HDMI® sink 72 transmits data to the HDMI® source 71, the switch 135 selects one of the CEC signal supplied from HDMI® sink 72 and the constituent signal supplied from the converting unit 134. The switch 135 then transmits the selected CEC signal or constituent signal to the transmitter 81 via the CEC line 84.

In addition, at a timing point when the HDMI® sink 72 receives data transmitted from the HDMI® source 71, the switch 135 receives one of the CEC signal transmitted from the transmitter 81 via the CEC line 84 and the constituent signal of the differential signal corresponding to Tx data. The switch 135 then supplies the received CEC signal or constituent signal to the HDMI® sink 72 or the decoding unit 136.

The decoding unit 136 is composed of, for example, a differential amplifier. Input terminals of the decoding unit 136 are connected to the CEC line 84 and signal line 141. The decoding unit 136 receives a differential signal transmitted from the transmitter 81 via the CEC line 84 and signal line 141, that is, the differential signal formed from the constituent signal on the CEC line 84 and the constituent signal on the signal line 141. The decoding unit 136 then decodes the differential signal into original Tx data and outputs the original Tx data.

The switching control unit 124 controls the switch 135 so that the switch 135 is switched to select one of the signals supplied to the switch 135. The timing control unit 123 controls a timing point at which the converting unit 134 transmits the differential signal.

Figure 7:
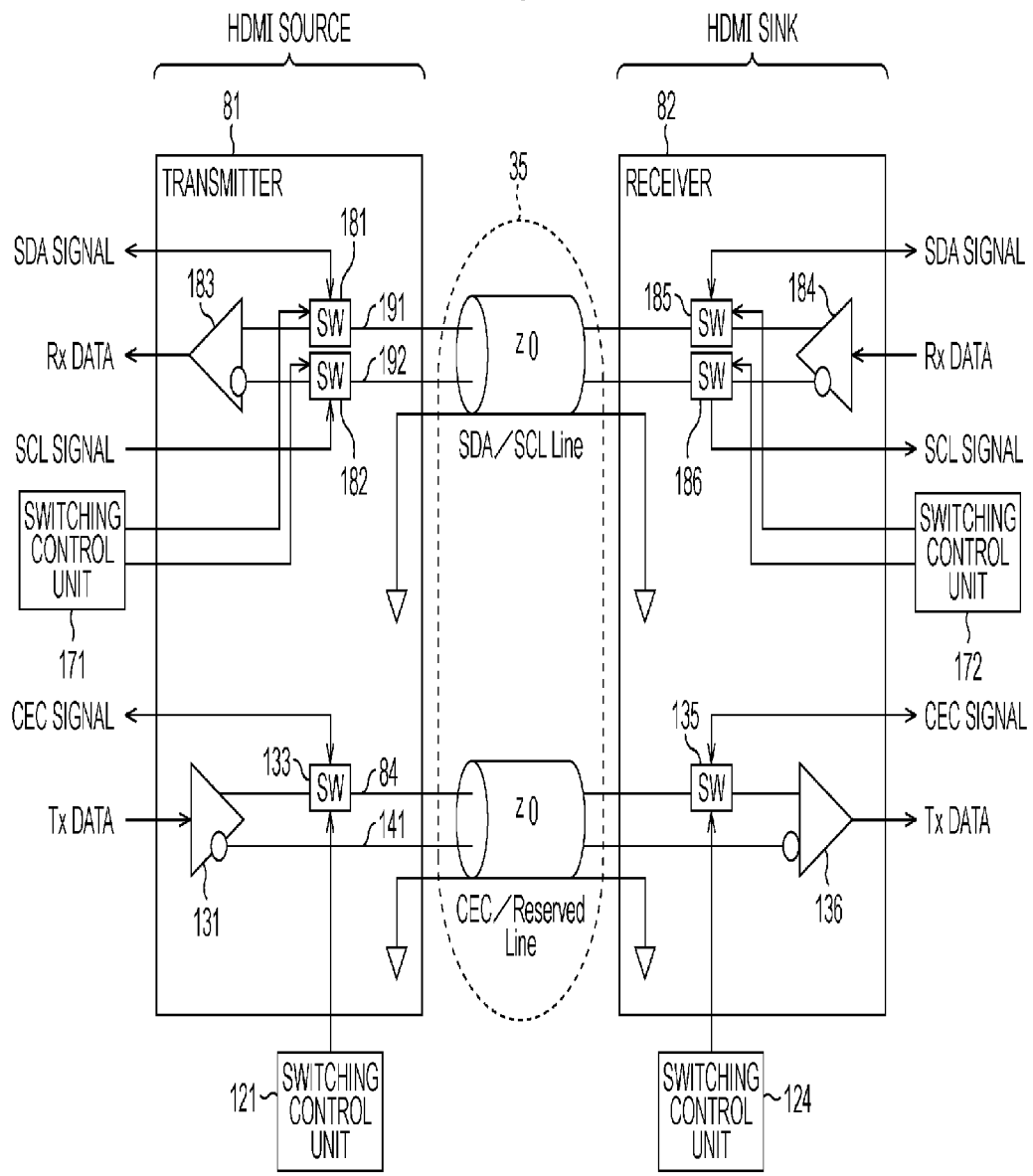
FIG. 7 is a diagram illustrating another example of the configuration of the HDMI® source and the HDMI® sink in more detail.

In addition, in order to perform full duplex IP communication using the CEC line 84 and the signal line 141 connected to the reserved pin and the signal line for transmitting the SDA signal and the signal line for transmitting the SCL signal, the HDMI® source 71 and the HDMI® sink 72 are configured, for example, as shown in FIG. 7. Note that the same numbering will be used in describing FIG. 7 as was used in describing FIG. 6, and the description thereof are not repeated where appropriate.

The HDMI® source 71 includes a transmitter 81, a switching control unit 121, and a switching control unit 171. In addition, the transmitter 81 includes a converting unit 131, a switch 133, a switch 181, a switch 182, and a decoding unit 183.

At a timing point when data is transmitted, the switch 181 is supplied with the SDA signal from the HDMI® source 71, while, at a timing point when data is received, the switch is supplied with the SDA signal from the receiver 82 or the constituent signal forming the differential signal corresponding to Rx data from the receiver 82. Under the control of the switching control unit 171, the switch 181 selectively outputs one of the SDA signal from the HDMI® source 71, the SDA signal from the receiver 82, and the constituent signal forming the differential signal corresponding to Rx data.

That is, at a timing point when the HDMI® source 71 receives data transmitted from the HDMI® sink 72, the switch 181 receives the SDA signal transmitted from the receiver 82 via an SDA line 191 which is the signal line for transmitting the SDA signal or the constituent signal of the differential signal corresponding to Rx data. The switch 181 then supplies the received SDA signal or the constituent signal to the HDMI® source 71 or the decoding unit 183.

In addition, at a timing point when the HDMI® source 71 transmits data to the HDMI® sink 72, the switch 181 transmits the SDA signal supplied from the HDMI® source 71 to the receiver 82 via the SDA line 191. Alternatively, the switch 181 transmits no signals to the receiver 82.

At a timing point when data is transmitted, the switch 182 is supplied with the SCL signal from the HDMI® source 71, while, at a timing point when data is received, the switch is supplied with the constituent signal forming the differential signal corresponding to Rx data from the receiver 82. Under the control of the switching control unit 171, the switch 182 selectively outputs one of the SCL signal and the constituent signal forming the differential signal corresponding to Rx data.

That is, at a timing point when the HDMI® source 71 receives data transmitted from the HDMI® sink 72, the switch 182 receives the constituent signal of the differential signal corresponding to Rx data transmitted from the receiver 82 via an SCL line 192 which is a signal line for transmitting the SCL signal and supplies the received constituent signal to the decoding unit 183. Alternatively, the switch 182 receives no signals.

In addition, at a timing point when the HDMI® source 71 transmits data to the HDMI® sink 72, the switch 182 transmits the SCL signal supplied from the HDMI® source 71 to the receiver 82 via the SCL line 192. Alternatively, the switch 182 transmits no signals to the receiver 82.

The decoding unit 183 includes, for example, a differential amplifier. Input terminals of the decoding unit 183 are connected to the SDA line 191 and SCL line 192. The decoding unit 183 receives a differential signal transmitted from the receiver 82 via the SDA line 191 and SCL line 192, that is, the differential signal formed from the constituent signal on the SDA line 191 and the constituent signal on the SCL line 192. The decoding unit 183 then decodes the differential signal into original Rx data and outputs the original Rx data.

The switching control unit 171 controls the switches 181 and 182 so that each of the switches 181 and 182 is switched to select one of the signals supplied thereto.

In addition, the HDMI® sink 72 includes a receiver 82, a switching control unit 124, and a switching control unit 172. Furthermore, the receiver 82 includes a switch 135, a decoding unit 136, a converting unit 184, a switch 185, and a switch 186.

The converting unit 184 is composed of, for example, a differential amplifier. The converting unit 184 receives supplied Rx data. The converting unit 184 converts the supplied Rx data into a differential signal formed from two constituent signals. The converting unit 184 then transmits the converted differential signal to the transmitter 81 via the SDA line 191 and the SCL line 192. That is, the converting unit 184 transmits one of the constituent signals forming the converted differential signal to the transmitter 81 via the switch 185. The converting unit 184 further transmits the other constituent signal forming the differential signal to the transmitter 81 via the switch 186.

At a timing point when data is transmitted, the switch 185 is supplied with the constituent signal forming the differential signal corresponding to Rx data from the converting unit 184 or the SDA signal from the HDMI® sink 72, while, at a timing point when data is received, the switch 185 is supplied with the SDA signal from the transmitter 81. Under the control of the switching control unit 172, the switch 185 selectively outputs one of the SDA signal from the HDMI® sink 72, the SDA signal from the transmitter 81, and the constituent signal forming the differential signal corresponding to Rx data.

That is, at a timing point when the HDMI® sink 72 receives data transmitted from the HDMI® source 71, the switch 185 receives the SDA signal transmitted from the transmitter 81 via the SDA line 191. The switch 185 then supplies the received SDA signal to the HDMI® sink 72. Alternatively, the switch 185 receives no signals.

In addition, at a timing point when the HDMI® sink 72 transmits data to the HDMI® source 71, the switch 185 transmits the SDA signal supplied from the HDMI® sink 72 or the constituent signal supplied from the converting unit 184 to the transmitter 81 via the SDA line 191.

At a timing point when data is transmitted, the switch 186 is supplied with the constituent signal forming the differential signal corresponding to Rx data from the converting unit 184, while, at a timing point when data is received, the switch is supplied with the SCL signal from the transmitter 81. Under the control of the switching control unit 172, the switch 186 selectively outputs one of the SCL signal and the constituent signal forming the differential signal corresponding to Rx data.

That is, at a timing point when the HDMI® sink 72 receives data transmitted from the HDMI® source 71, the switch 186 receives the SCL signal transmitted from the transmitter 81 via the SCL line 192. The switch 186 then supplies the received SCL signal to the HDMI® sink 72. Alternatively, the switch 186 receives no signals.

In addition, at a timing point when the HDMI® sink 72 transmits data to the HDMI® source 71, the switch 186 transmits the constituent signal supplied from the converting unit 184 to the transmitter 81 via the SCL line 192. Alternatively, the switch 186 transmits no signals.

The switching control unit 172 controls the switches 185 and 186 so that each of the switches 185 and 186 is switched to select ones of the signals supplied thereto.

Furthermore, when the HDMI® source 71 and HDMI® sink 72 perform IP communication, whether half duplex communication or full duplex communication is available is determined by each of the configurations of the HDMI® source 71 and HDMI® sink 72. Therefore, by referring to E-EDID received from the HDMI® sink 72, the HDMI® source 71 determines whether it performs half duplex communication, full duplex communication, or bidirectional communication through exchange of the CEC signal.

Figure 8:
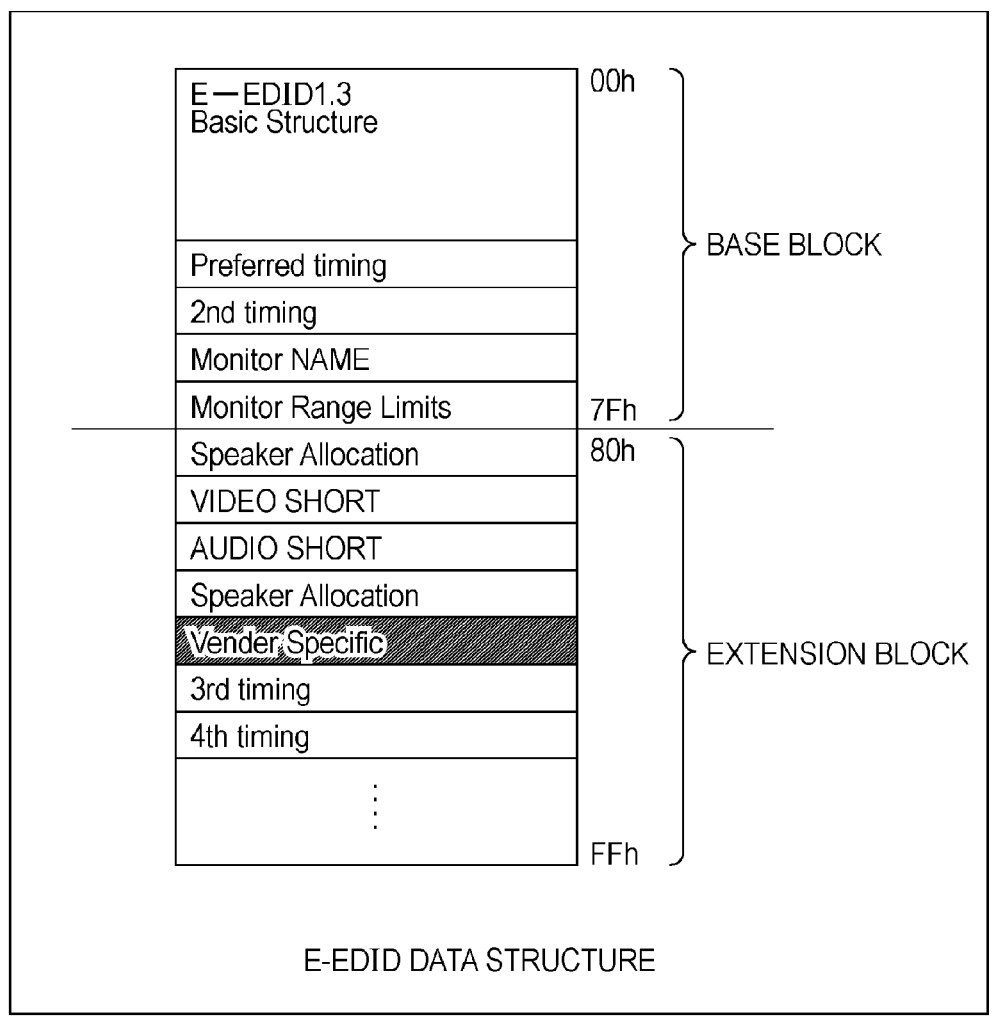
FIG. 8 is a diagram illustrating the data structure of E-EDID.

For example, as shown in FIG. 8, E-EDID received by the HDMI® source 71 includes a base block and an expansion block.

Data defined by "E-EDID1.3 Basic Structure" of the E-EDID1.3 standard is placed at the head of the base block of E-EDID, followed by timing information identified by "Preferred timing" for maintaining compatibility with existing EDID and timing information identified by "2nd timing" different from "Preferred timing" for maintaining compatibility with existing EDID.

In the base block, "2nd timing" is followed by information indicating a display device name identified by "Monitor NAME" and information identified by "Monitor Range Limits" indicating the numbers of displayable pixels when the aspect ratios are 4:3 and 16:9.

At the head of the expansion block, information on right and left speakers represented by "Speaker Allocation" is placed, followed by: data identified by "VIDEO SHORT" describing information on a displayable image size, a frame rate, interlace or progressive, and data describing an aspect ratio; data identified by "AUDIO SHORT" describing information on a playable audio codec method, a sampling frequency, a cut-off frequency range, the number of codec bits and the like; and information identified by "Speaker Allocation" on right and left speakers.

In addition, "Speaker allocation" is followed by data identified by "Vender Specific" and defined by each vendor, timing information identified by "3rd timing" for maintaining compatibility with existing EDID, and timing information identified by "4th timing" for maintaining compatibility with existing EDID.

Data identified by "Vender Specific" has a data structure shown in FIG. 9. That is, the data identified by "Vender Specific" includes 0th to Nth one-byte blocks.

In the 0-th block located at the head of the data identified by "Vender Specific", the following information is placed: information identified by "Vendor-Specific tag code(=3) serving as a header that indicates the data area of the data "Vender Specific" and information identified by "Length(=N)" representative of the length of the data "Vender Specific".

Information identified by "24 bit IEEE Registration Identifier(0x000C03) LSB first" indicating the number "0x000003" registered for HDMI® is placed in the 1st to 3rd blocks. Information representative of the 24-bit physical address (indicated by "A", "B", "C" and "D") of a sink device is placed in the 4th and 5th blocks.

In addition, the following information is placed in the 6th block: a flag identified by "Supports-AI" indicating a function that the sink device supports; information identified by "DC-48 bit", "DC-36 bit" and "DC-30 bit" each indicating the number of bits per pixel; a flag identified by "DC-Y444" indicating whether the sink device supports transmission of an image of YCbCr 4:4:4; and a flag identified by "DVI-Dual" indicating whether the sink device supports a dual digital visual interface (DVI).

Furthermore, information identified by "Max-TMDS-Clock" representative of the highest frequency of a TMDS pixel clock is placed in the 7th block. Still furthermore, the following flags are placed in the 8th block: a flag identified by "Latency" indicating presence/absence of delay information regarding video and sound, a full duplex flag identified by "Full Duplex" indicating whether full duplex communication is available, and a half duplex flag identified by "Half Duplex" indicating whether half duplex communication is available.

Here, for example, the full duplex flag that is set (e.g., set to "1") indicates that the HDMI® sink 72 has a capability of conducting full duplex communication, that is, the HDMI® sink 72 has the configuration shown in FIG. 7, whereas the full duplex flag that is reset (e.g., set to "0") indicates that the HDMI® sink 72 does not have a capability of conducting full duplex communication.

The half duplex flag that is set (e.g., set to "1") indicates that the HDMI® sink 72 has a capability of conducting half duplex communication, i.e., the HDMI® sink 72 has the configuration shown in FIG. 6, whereas the half duplex flag that is reset (e.g., set to "0") indicates that the HDMI® sink 72 does not have a capability of conducting half duplex communication.

Delay time data of a progressive image identified by "Video Latency" is placed in the 9th block of the data identified by "Vender Specific". Delay time data, identified by "Audio Latency", of audio signals associated with the progressive image is placed in the 10th block. Furthermore, delay time data, identified by "Interlaced Video Latency", of an interlace image is placed in the 11th block. Delay time data, identified by "Interlaced Audio Latency", of audio signals associated with the interlace image is placed in the 12th block.

In accordance with the full duplex flag and the half duplex flag contained in E-EDID received from the HDMI® sink 72, the HDMI® source 71 determines whether it performs the half duplex communication, full duplex communication, or bidirectional communication through exchange of the CEC signal. The HDMI® source 71 then performs bidirectional communication with the HDMI® sink 72 in accordance with the determination result.

For example, if the HDMI® source 71 has the configuration shown in FIG. 6, the HDMI® source 71 can perform half duplex communication with the HDMI® sink 72 shown in FIG. 6. However, the HDMI® source 71 cannot perform half duplex communication with the HDMI® sink 72 shown in FIG. 7.

Therefore, when the electronic apparatus including the HDMI® source 71 is powered on, the HDMI® source 71 starts a communication process and performs bidirectional communication corresponding to the capability of the HDMI® sink 72 connected to the HDMI® source 71.

Figure 10:
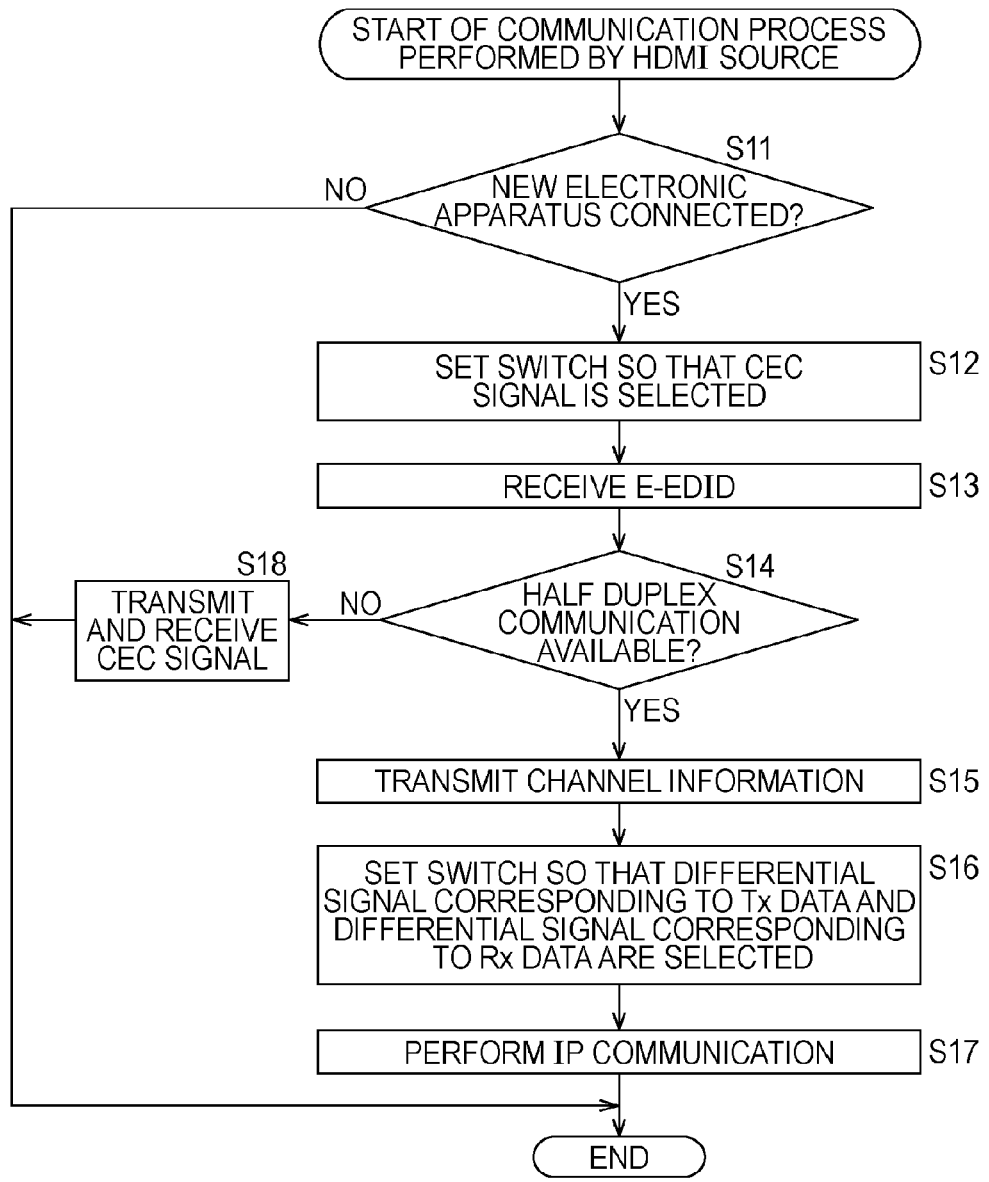
FIG. 10 is a flowchart illustrating a communication process performed by the HDMI® source.

The communication process performed by the HDMI® source 71 shown in FIG. 6 is described below with reference to the flowchart shown in FIG. 10.

In step S11, the HDMI® source 71 determines whether a new electronic apparatus is connected to the HDMI® source 71. For example, the HDMI® source 71 determines whether a new electronic apparatus including the HDMI® sink 72 is connected thereto on the basis of the level of a voltage applied to a pin called "Hot Plug Detect" to which the signal line 86 is connected.

If, in step S11, it is determined that a new electronic apparatus is not connected, communication is not performed. Accordingly, the communication process is completed.

However, if, in step S11, it is determined that a new electronic apparatus is connected, the switching control unit 121, in step S12, controls the switch 133 so that the switch 133 is switched to select the CEC signal from the HDMI® source 71 and select the CEC signal from the receiver 82 when data is received.

In step S13, the HDMI® source 71 receives E-EDID transmitted from the HDMI® sink 72 via the DDC 83. That is, upon detecting connection of the HDMI® source 71, the HDMI® sink 72 reads E-EDID from the EDIDROM 85 and transmits the read E-EDID to the HDMI® source 71 via the DDC 83. Accordingly, the HDMI® source 71 receives the E_EDID transmitted from the HDMI® sink 72.

In step S14, the HDMI® source 71 determines whether it can perform half duplex communication with the HDMI® sink 72. That is, the HDMI® source 71 refers to the E-EDID received from the HDMI® sink 72 and determines whether the half duplex flag "Half Duplex" shown in FIG. 9 is set. For example, if the half duplex flag is set, the HDMI® source determines that it can perform bidirectional IP communication using a half duplex communication method, i.e., half duplex communication.

If, in step S14, it is determined that half duplex communication is available, the HDMI® source 71, in step S15, transmits a signal indicating that IP communication based on a half duplex communication method is performed using the CEC line 84 and the signal line 141, as channel information representative of a channel to be used for the bidirectional communication, to the receiver 82 via the switch 133 and CEC line 84.

That is, if the half duplex flag is set, the HDMI® source 71 can know that the HDMI® sink 72 has the configuration shown in FIG. 6 and that it can perform half duplex communication using the CEC line 84 and signal line 141. The HDMI® source 71 transmits the channel information to the HDMI® sink 72, so that the HDMI® sink 72 is informed that half duplex communication is to be performed.

In step S16, the switching control unit 121 controls the switch 133 so that the switch 133 is switched to select the differential signal corresponding to Tx data from the converting unit 131 when data is transmitted and select the differential signal corresponding to Rx data from the receiver 82 when data is received.

In step S17, each component of the HDMI® source 71 performs bidirectional IP communication with the HDMI® sink 72 using the half duplex communication method. Thereafter, the communication process is completed. That is, when data is transmitted, the converting unit 131 converts the Tx data supplied from the HDMI® source 71 into a differential signal and supplies one of constituent signals forming the converted differential signal to the switch 133 and the other constituent signal to the receiver 82 via the signal line 141. The switch 133 transmits the constituent signal supplied from the converting unit 131 to the receiver 82 via the CEC line 84. In this manner, the differential signal corresponding to the Tx data is transmitted from the HDMI® source 71 to the HDMI® sink 72.

When data is received, the decoding unit 132 receives a differential signal corresponding to the Rx data transmitted from the receiver 82. That is, the switch 133 receives the constituent signal of the differential signal corresponding to the Rx data transmitted from the receiver 82 via the CEC line and supplies the received constituent signal to the decoding unit 132. Under the control of the timing control unit 122, the decoding unit 132 decodes the differential signal formed from the constituent signal supplied from the switch 133 and the constituent signal supplied from the receiver 82 via the signal line 141 into the original Rx data. The decoding unit 132 then output the original Rx data to the HDMI® source 71.

In this way, the HDMI® source 71 exchanges various data, such as control data, pixel data, and audio data, with the HDMI® sink 72.

However, If, in step S14, it is determined that half duplex communication cannot be performed, each component of the HDMI® source 71, in step S18, performs bidirectional communication with the HDMI® sink 72 by receiving and transmitting the CEC signal from and to the HDMI® sink 72. Thereafter, the communication process is completed.

That is, when data is transmitted, the HDMI® source 71 transmits the CEC signal to the receiver 82 via the switch 133 and CEC line 84. When data is received, the HDMI® source 71 receives the CEC signal transmitted from the receiver 82 via the switch 133 and CEC line 84. In this way, the HDMI® source 71 exchanges the control data with the HDMI® sink 72.

In this manner, the HDMI® source 71 refers to the half duplex flag and performs half duplex communication with the HDMI® sink 72 capable of performing half duplex communication by using the CEC line 84 and signal line 141.

As described above, by switching the switch 133 to select one of transmission data and reception data and performing half duplex communication with the HDMI® sink 72 using the CEC line 84 and signal line 141, i.e., IP communication using a half duplex communication method, high speed bidirectional communication can be performed while maintaining compatibility with existing HDMI®.

In addition, like the HDMI® source 71, when the electronic apparatus including the HDMI® sink 72 is powered on, the HDMI® sink 72 starts a communication process and performs bidirectional communication with the HDMI® source 71.

Figure 11:
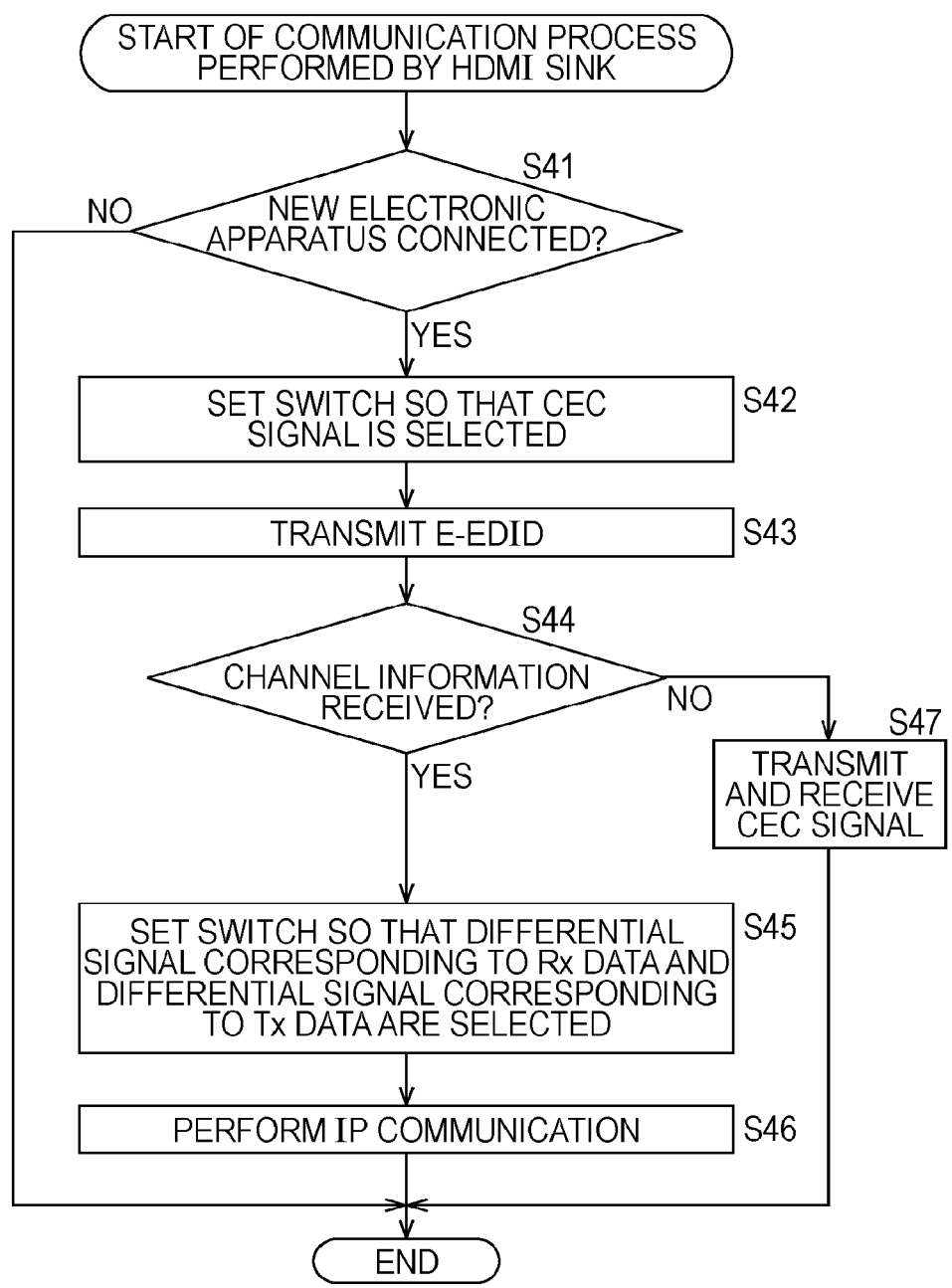
FIG. 11 is a flowchart illustrating a communication process performed by the HDMI® sink.

A communication process performed by the HDMI® sink 72 shown in FIG. 6 is described below with reference to the flowchart of FIG. 11.

In step S41, the HDMI® sink 72 determines whether a new electronic apparatus is connected to the HDMI® sink 72. For example, the HDMI® sink 72 determines whether a new electronic apparatus including the HDMI® source 71 is connected on the basis of the level of a voltage applied to the pin called "Hot Plug Detect" and to which the signal line 86 is connected.

If, in step S41, it is determined that a new electronic apparatus is not connected, communication is not performed. Thereafter, the communication process is completed.

However, if, in step S41, it is determined that a new electronic apparatus is connected, the switching control unit 124, in step S42, controls the switch 135 so that the switch 135 is switched to select the CEC signal from the HDMI® sink 72 when data is transmitted and select the CEC signal from the transmitter 81 when data is received.

In step S43, the HDMI® sink 72 reads the E-EDID from the EDIDROM 85 and transmits the readout E-EDID to the HDMI® source 71 via the DDC 83.

In step S44 the HDMI® sink 72 determines whether channel information transmitted from the HDMI® source 71 is received.

That is, channel information indicating a bidirectional communication channel is transmitted from the HDMI® source 71 in accordance with the capabilities of the HDMI® source 71 and the HDMI® sink 72. For example, if the HDMI® source 71 has the configuration shown in FIG. 6, the HDMI® source 71 and HDMI® sink 72 can perform half duplex communication using the CEC line 84 and signal line 141. Therefore, the channel information indicating that IP communication is performed using the CEC line 84 and the signal line 141 is transmitted from the HDMI® source 71 to the HDMI® sink 72. The HDMI® sink 72 receives the channel information transmitted from the HDMI® source 71 via the switch 135 and the CEC line 84 and determines that the channel information is received.

In contrast, if the HDMI® source 71 does not have the half duplex communication capability, the channel information is not transmitted from the HDMI® source 71 to the HDMI® sink 72. Accordingly, the HDMI® sink 72 determines that the channel information is not received.

If, in step S44, it is determined that the channel information is received, the processing proceeds to step S45, where the switching control unit 124 controls the switch 135 so that the switch 135 is switched to select the differential signal corresponding to the Rx data from the converting unit 134 when data is transmitted and select the differential signal corresponding to the Tx data from the transmitter 81 when data is received.

In step S46, each component of the HDMI® sink 72 performs bidirectional IP communication with the HDMI® source 71 using the half duplex communication method. Thereafter, the communication process is completed. That is, when data is transmitted, under the control of the timing control unit 123, the converting unit 134 converts the Rx data supplied from the HDMI® sink 72 into a differential signal. The converting unit 134 then supplies one of constituent signals forming the converted differential signal to the switch 135 and the other constituent signal to the transmitter 81 via the signal line 141. The switch 135 transmits the constituent signal supplied from the converting unit 134 to the transmitter 81 via the CEC line 84. In this way, the differential signal corresponding to the Rx data is transmitted from the HDMI® sink 72 to the HDMI® source 71.

In addition, when data is received, the decoding unit 136 receives a differential signal corresponding to the Tx data transmitted from the transmitter 81. That is, the switch 135 receives the constituent signal of the differential signal corresponding to the Tx data transmitted from the transmitter 81 via the CEC line 84. The switch 135 then supplies the received constituent signal to the decoding unit 136. The decoding unit 136 decodes the differential signal formed from the constituent signal supplied from the switch 135 and the constituent signal supplied from the transmitter 81 via the signal line 141 into the original Tx data. The decoding unit 136 then outputs the original Tx data to the HDMI® sink 72.

In this manner, the HDMI® sink 72 exchanges various data, such as control data, pixel data, and audio data, with the HDMI® source 71.

However, if, in step S44, it is determined that the channel information is not received, each component of the HDMI® sink 72, in step S47, performs bidirectional communication with the HDMI® source 71 by receiving and transmitting the CEC signal from and to the HDMI® source 71. Thereafter, the communication process is completed.

That is, when data is transmitted, the HDMI® sink transmits the CEC signal to the transmitter 81 via the switch 135 and the CEC line 84. When data is received, the HDMI® sink 72 receives the CEC signal transmitted from the transmitter 81 via the switch 135 and the CEC line 84. In this way, the HDMI® sink 72 exchanges the control data with the HDMI® source 71.

In this manner, upon receiving the channel information, the HDMI® sink 72 performs half duplex communication with the HDMI® sink 72 by using the CEC line 84 and the signal line 141.

As described above, by switching the switch 135 so as to select one of transmission data and reception data and performing half duplex communication with the HDMI® source 71 using the CEC line 84 and the signal line 141, the HDMI® sink 72 can perform high-speed bidirectional communication while maintaining compatibility with existing HDMI®.

In addition, when the HDMI® source 71 has the configuration shown in FIG. 7 and the HDMI® source 71 performs a communication process, the HDMI® source 71 determines whether the HDMI® sink 72 has a full duplex communication capability on the basis of the full duplex flag contained in the E-EDID. The HDMI® source 71 then performs bidirectional communication in accordance with the determination result.

Figure 12:
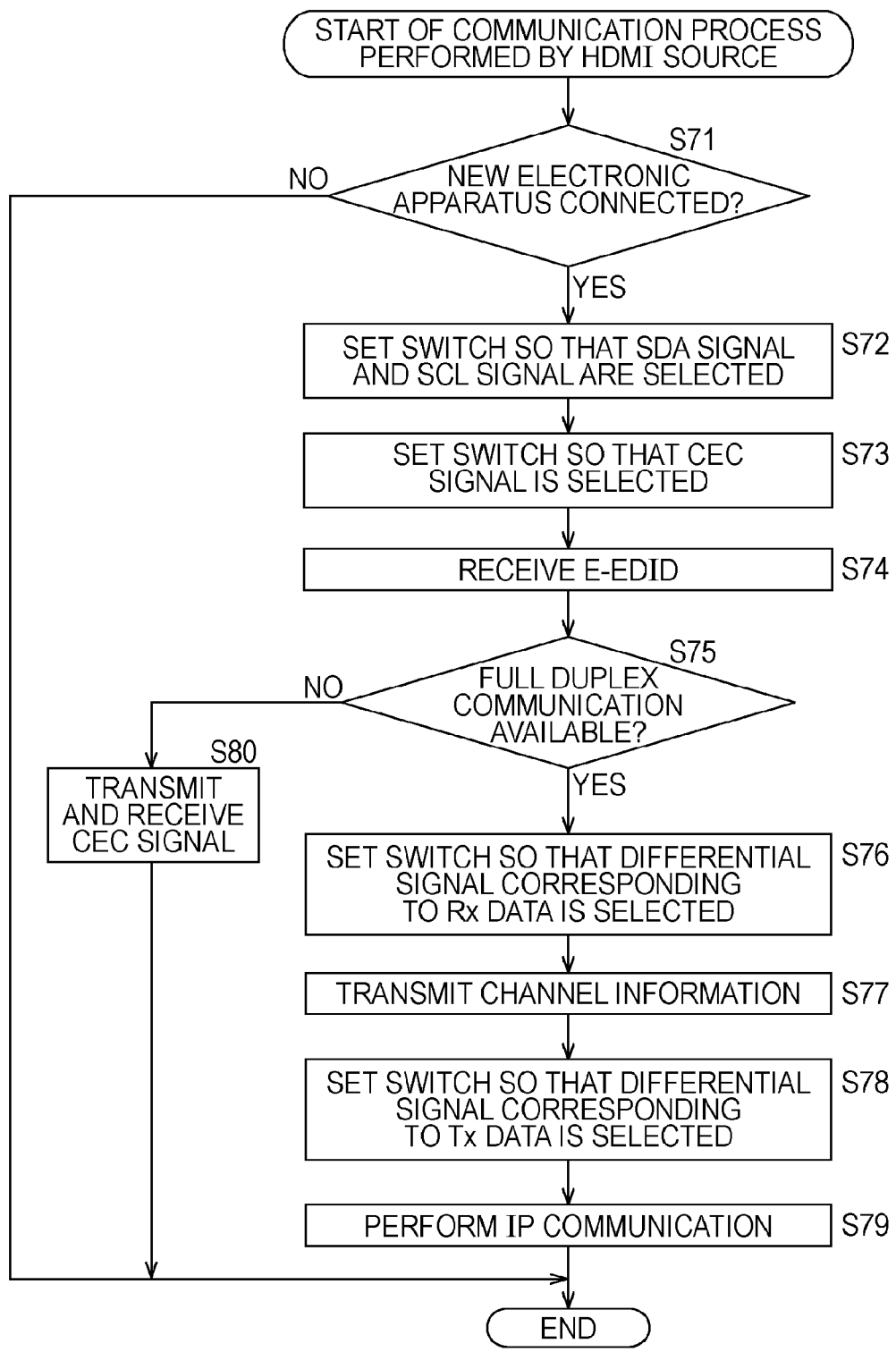
FIG. 12 is a flowchart illustrating a communication process performed by the HDMI® source.

A communication process performed by the HDMI® source 71 shown in FIG. 7 is described below with reference to the flowchart shown in FIG. 12.

In step S71, the HDMI® source 71 determines whether a new electronic apparatus is connected to the HDMI® source 71. If, in step S71, it is determined that a new electronic apparatus is not connected, communication is not performed. Therefore, the communication process is completed.

In contrast, if, in step S71, it is determined that a new electronic apparatus is connected, the switching control unit 171, in step S72, controls the switches 181 and 182 so that, when data is transmitted, the switch 181 selects the SDA signal from the HDMI® source 71 and the switch 182 selects the SCL signal from the HDMI® source 71 and, when data is received, the switch 181 selects the SDA signal from the receiver 82.

In step S73, the switching control unit 121 controls the switch 133 so that the switch 133 is switched to select the CEC signal from the HDMI® source 71 when data is transmitted and select the CEC signal from the receiver 82 when data is received.

In step S74, the HDMI® source 71 receives the E-EDID transmitted from the HDMI® sink 72 via the SDA line 191 of the DDC 83. That is, upon detecting connection of the HDMI® source 71, the HDMI® sink 72 reads the E-EDID from the EDIDROM 85 and transmits the readout E-EDID to the HDMI® source 71 via the SDA line 191 of the DDC 83. Accordingly, the HDMI® source 71 receives the E-EDID transmitted from the HDMI® sink 72.

In step S75, the HDMI® source 71 determines whether it can perform full duplex communication with the HDMI® sink 72. That is, the HDMI® source 71 refers to the E-EDID received from the HDMI® sink 72 and determines whether the full duplex flag "Full Duplex" shown in FIG. 9 is set. For example, if the full duplex flag is set, the HDMI® source determines that it can perform bidirectional IP communication using a full duplex communication method, that is, full duplex communication.

If, in step S75, it is determined that full duplex communication can be performed, the switching control unit 171, in step S76, controls the switches 181 and 182 so that the switches 181 and 182 are switched to select the differential signal corresponding to the Rx data from the receiver 82 when data is received.

That is, when data is received, the switching control unit 171 controls switching of the switches 181 and 182 so that, among the constituent signals forming the differential signal corresponding to the Rx data transmitted from the receiver 82, the constituent signal transmitted via the SDA line 191 is selected by the switch 181, and the constituent signal transmitted via the SCL line 192 is selected by the switch 182.

After the E-EDID is transmitted from the HDMI® sink 72 to the HDMI® source 71, the SDA line 191 and the SCL line 192 forming the DDC 83 are not used, that is, transmission and reception of the SDA and SCL signals via the SDA line 191 and the SCL line 192 are not performed. Therefore, by switching the switches 181 and 182, the SDA line 191 and the SCL line 192 can be used as transmission lines of the Rx data for full duplex communication.

In step S77, as channel information indicating a channel to be used for bidirectional communication, the HDMI® source 71 transmits, to the receiver 82 via the switch 133 and the CEC line 84, a signal indicating that IP communication based on a full duplex communication method is performed using a pair consisting of the CEC line 84 and the signal line 141 and a pair consisting of the SDA line 191 and the SCL line 192.

That is, if the full duplex flag is set, the HDMI® source 71 can know that the HDMI® sink 72 has the configuration shown in FIG. 7 and that full duplex communication can be performed using a pair consisting of the CEC line 84 and the signal line 141 and a pair consisting of the SDA line 191 and the SCL line 192. Accordingly, the HDMI® source 71 transmits the channel information to the HDMI® sink 72 in order to inform the HDMI® sink 72 that full duplex communication is performed.

In step S78, the switching control unit 121 controls the switch 133 so that the switch 133 is switched to select the differential signal corresponding to the Tx data from the converting unit 131 when data is transmitted. That is, the switching control unit 121 switches the switch 133 so that the switch 133 selects the constituent signal of the differential signal supplied from the converting unit 131 and corresponding to the Tx data.

In step S79, each component of the HDMI® source 71 performs bidirectional IP communication with the HDMI® sink 72 using the full duplex communication method. Thereafter, the communication process is completed. That is, when data is transmitted, the converting unit 131 converts the Tx data supplied from the HDMI® source 71 into a differential signal. The converting unit 131 then supplies one of constituent signals forming the converted differential signal to the switch 133 and the other constituent signal to the receiver 82 via the signal line 141. The switch 133 transmits the constituent signal supplied from the converting unit 131 to the receiver 82 via the CEC line 84. In this manner, the differential signal corresponding to the Tx data is transmitted from the HDMI® source 71 to the HDMI® sink 72.

In addition, when data is received, the decoding unit 183 receives a differential signal corresponding to the Rx data transmitted from the receiver 82. That is, the switch 181 receives the constituent signal of the differential signal corresponding to the Rx data transmitted from the receiver 82 via the SDA line 191. The switch 181 then supplies the received constituent signal to the decoding unit 183. In addition, the switch 182 receives the other constituent signal of the differential signal corresponding to the Rx data transmitted from the receiver 82 via the SCL line 192. The switch 182 then supplies the received constituent signal to the decoding unit 183. The decoding unit 183 decodes the differential signal formed from the constituent signals supplied from the switches 181 and 182 into the original Rx data and outputs the original Rx data to the HDMI® source 71.

In this manner, the HDMI® source 71 exchanges various data, such as control data, pixel data, and audio data, with the HDMI® sink 72.

However, if, in step S75, it is determined that full duplex communication cannot be performed, each component of the HDMI® source 71, in step S80, performs bidirectional communication with the HDMI® sink 72 by receiving and transmitting the CEC signal from and to the HDMI® sink 72. Thereafter, the communication process is terminated.

That is, when data is transmitted, the HDMI® source 71 transmits the CEC signal to the receiver 82 via the switch 133 and CEC line 84 and, when data is received, the HDMI® source 71 receives the CEC signal transmitted from the receiver 82 via the switch 133 and the CEC line 84. Thus, the HDMI® source 71 communicates the control data with the HDMI® sink 72.

In this manner, the HDMI® source 71 refers to the full duplex flag and performs full duplex communication with the HDMI® sink 72 capable of performing full duplex communication by using the pair consisting of the CEC line 84 and the signal line 141 and the pair consisting of the SDA line 191 and the SCL line 192.

As described above, by switching the switches 133, 181 and 182, selecting transmission data and reception data, and performing full duplex communication with the HDMI® sink 72 by using the pair consisting of the CEC line 84 and the signal line 141 and the pair consisting of the SDA line 191 and the SCL line 192, high-speed bidirectional communication can be performed while maintaining compatibility with existing HDMI®.

As in the case of the HDMI® sink 72 shown in FIG. 6, when the HDMI® sink 72 has the configuration shown in FIG. 7, the HDMI® sink 72 executes a communication process so as to perform bidirectional communication with the HDMI® source 71.

Figure 13:
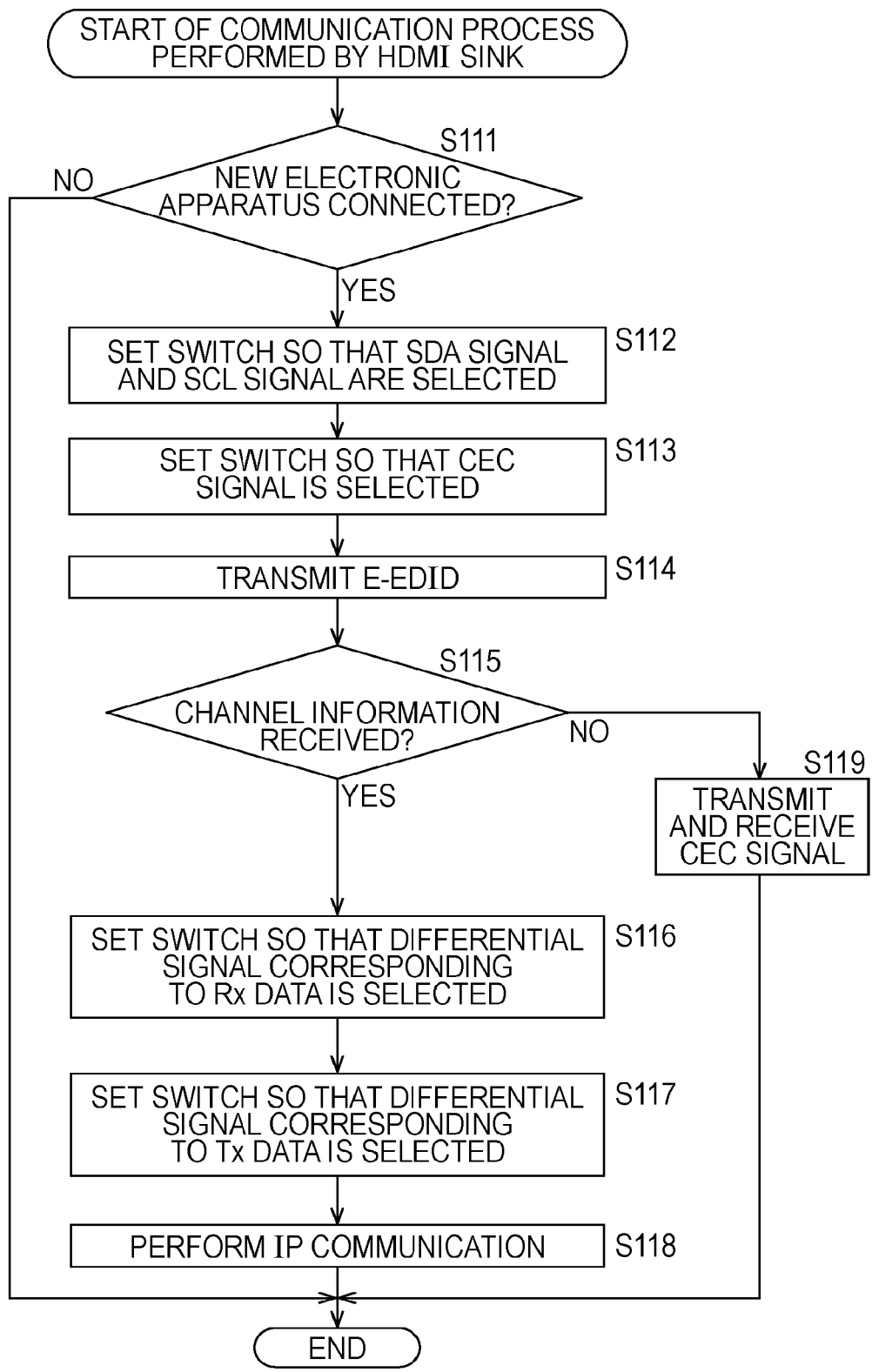
FIG. 13 is a flowchart illustrating a communication process performed by the HDMI® sink.

A communication process performed by the HDMI® sink 72 shown in FIG. 7 is described below with reference to the flowchart of FIG. 13.

In step S111, the HDMI® sink 72 determines whether a new electronic apparatus is connected to the HDMI® sink 72. If, in step S111, it is determined that a new electronic apparatus is not connected, communication is not performed. Therefore, the communication process is completed.

In contrast, if, in step S111, it is determined that a new electronic apparatus is connected, the switching control unit 172, in step S112, controls switching of the switches 185 and 186 so that, when data is transmitted, the switch 185 selects the SDA signal from the HDMI® sink 72 and, when data is received, the switch 185 selects the SDA signal from the transmitter 81 and the switch 186 selects the SCL signal from the transmitter 81.

In step S113, the switching control unit 124 controls the switch 135 so that the switch 135 is switched to select the CEC signal from the HDMI® sink 72 when data is transmitted and select the CEC signal from the transmitter 81 when data is received.

In step S114, the HDMI® sink 72 reads the E-EDID from the EDIDROM 85 and transmits the readout E-EDID to the HDMI® source 71 via the switch 185 and the SDA line 191 of the DDC 83.

In step S115, the HDMI® sink 72 determines whether channel information transmitted from the HDMI® source 71 is received.

That is, channel information indicating a bidirectional communication channel is transmitted from the HDMI® source 71 in accordance with the capabilities of the HDMI® source 71 and HDMI® sink 72. For example, when the HDMI® source 71 has the configuration shown in FIG. 7, the HDMI® source 71 and HDMI® sink 72 can perform full duplex communication. Accordingly, the HDMI® source 71 transmits, to the HDMI® sink 72, channel information indicating that IP communication by a full duplex communication method is performed using the pair consisting of the CEC line 84 and the signal line 141 and the pair consisting of the SDA line 191 and the SCL line 192. Consequently, the HDMI® sink 72 receives the channel information transmitted from the HDMI® source 71 via the switch 135 and the CEC line 84 and determines that the channel information is received.

However, if the HDMI® source 71 does not have the full duplex communication capability, the channel information is not transmitted from the HDMI® source 71 to the HDMI® sink 72. Accordingly, the HDMI® sink 72 determines that the channel information has not been received.

If, in step S115, it is determined that the channel information has not been received, the processing proceeds to step S116, where the switching control unit 172 controls switching of the switches 185 and 186 so that the switches 185 and 186 select the differential signal corresponding to the Rx data from the converting unit 184 when data is transmitted.

In step S117, the switching control unit 124 controls switching of the switch 135 so that the switch 135 selects the differential signal corresponding to the Tx data from the transmitter 81 when data is received.

In step S118, each component of the HDMI® sink 72 performs bidirectional IP communication with the HDMI® source 71 using a full duplex communication method. Thereafter, the communication process is completed. That is, when data is transmitted, the converting unit 184 converts the Rx data supplied from the HDMI® sink 72 into a differential signal and supplies one of constituent signals forming the converted differential signal to the switch 185 and supplies the other constituent signal to the switch 186. The switches 185 and 186 transmit the constituent signals supplied from the converting unit 184 to the transmitter 81 via the SDA line 191 and the SCL line 192. In this manner, the differential signal corresponding to the Rx data is transmitted from the HDMI® sink 72 to the HDMI® source 71.

In addition, when data is received, the decoding unit 136 receives the differential signal corresponding to the Tx data transmitted from the transmitter 81. That is, the switch 135 receives the constituent signal of the differential signal corresponding to the Tx data transmitted from the transmitter 81 via the CEC line 84. The switch 135 then supplies the received constituent signal to the decoding unit 136. The decoding unit 136 decodes the differential signal formed from the constituent signal supplied from the switch 135 and the constituent signal supplied from the transmitter 81 via the signal line 141 into the original Tx data. The decoding unit 136 then outputs the original Tx data to the HDMI® sink 72.

In this manner, the HDMI® sink 72 exchanges various data, such as control data, pixel data, and audio data, with the HDMI® source 71.

However, if, in step S115, it is determined that the channel information has not been received, each component of the HDMI® sink 72, in step S119, performs bidirectional communication with the HDMI® source 71 by receiving and transmitting the CEC signal from and to the HDMI® source 71. Thereafter, the communication process is completed.

In this manner, upon receiving the channel information, the HDMI® sink 72 performs full duplex communication with the HDMI® sink 72 using the pair consisting of the CEC line 84 and the signal line 141 and the pair consisting of the SDA line 191 and the SCL line 192.

As described above, by switching the switches 135, 185 and 186 so as to select transmission data and reception data and performing full duplex communication with the HDMI® source 71 using the pair consisting of the CEC line 84 and the signal line 141 and the pair consisting of the SDA line 191 and the SCL line 192, the HDMI® sink 72 can perform high-speed bidirectional communication while maintaining compatibility with existing HDMI®.

While, in the configuration of the HDMI® source 71 shown in FIG. 7, the converting unit 131 is connected to the CEC line 84 and the signal line 141 and the decoding unit 183 is connected to the SDA line 191 and the SCL line 192, the configuration may be used in which the decoding unit 183 is connected to the CEC line 84 and the signal line 141 and the converting unit 131 is connected to the SDA line 191 and the SCL line 192.

In such a case, the switches 181 and 182 are connected to the CEC line 84 and the signal line 141, respectively. The switches 181 and 182 are further connected to the decoding unit 183. The switch 133 is connected to the SDA line 191. The switch 133 is further connected to the converting unit 131.

Similarly, in the configuration of the HDMI® sink 72 shown in FIG. 7, the converting unit 184 may be connected to the CEC line 84, and the signal line 141 and the decoding unit 136 may be connected to the SDA line 191 and the SCL line 192. In this case, the switches 185 and 186 are connected to the CEC line 84 and the signal line 141, respectively. The switches 185 and 186 are further connected to the converting unit 184. The switch 135 is connected to the SDA line 191. The switch 135 is further connected to the decoding unit 136.

Furthermore, in FIG. 6, the CEC line 84 and the signal line 141 may serve as the SDA line 191 and the SCL line 192. That is, the converting unit 131 and the decoding unit 132 of the HDMI® source 71 and the converting unit 134 and decoding unit 136 of the HDMI® sink 72 may be connected to the SDA line 191 and the SCL line 192 so that the HDMI® source 71 and the HDMI® sink 72 perform IP communication using a half duplex communication method. Still furthermore, in such a case, connection of an electronic apparatus may be detected by using a reserved pin of the connector to which the signal line 141 is connected.

Furthermore, each of the HDMI® source 71 and the HDMI® sink 72 may have the half duplex communication capability and the full duplex communication capability. In such a case, the HDMI® source 71 and the HDMI® sink 72 can perform IP communication using a half duplex communication method or a full duplex communication method in accordance with the capability of the connected electronic apparatus.

Figure 14:
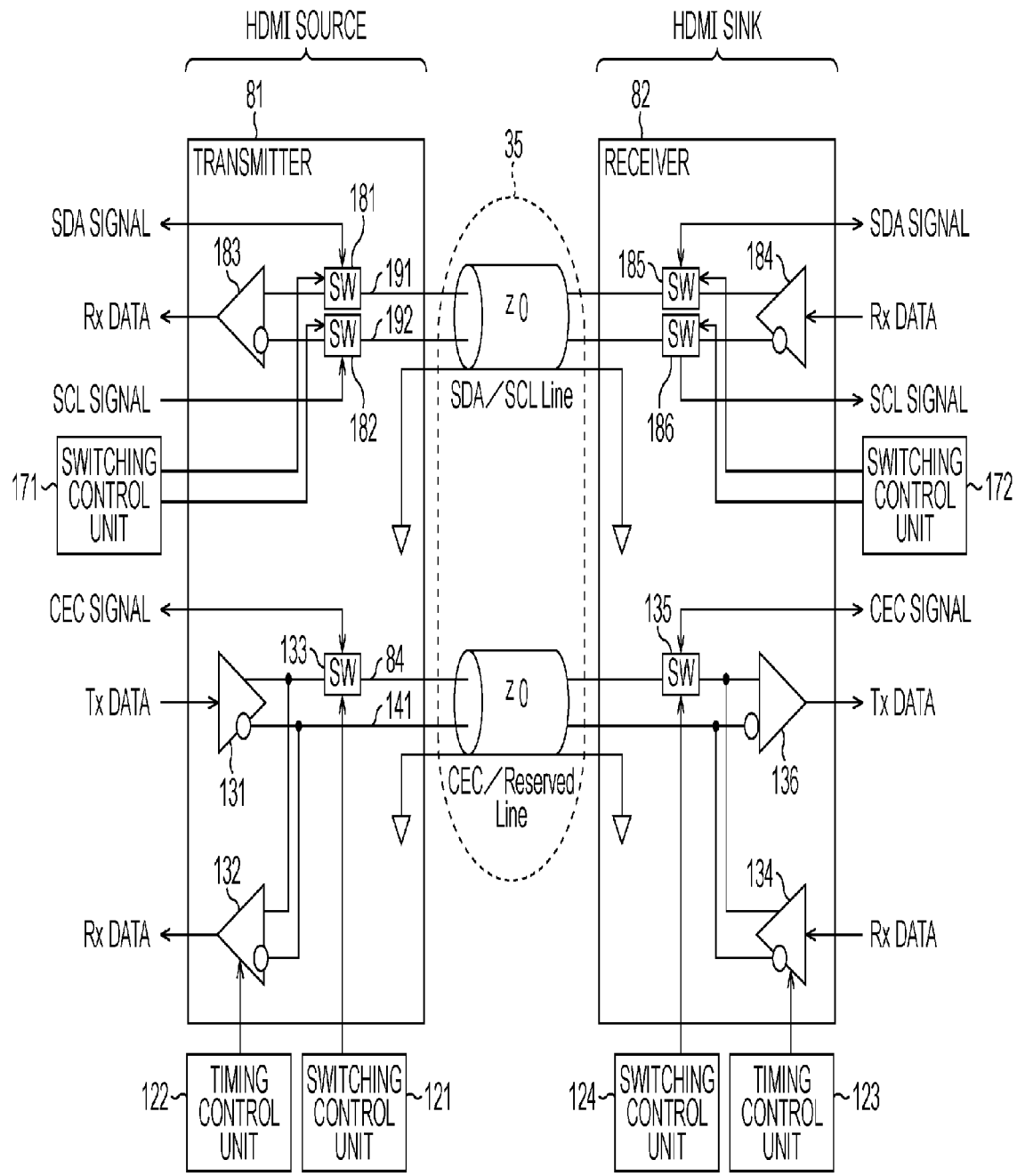
FIG. 14 is a diagram illustrating another example of the configuration of the HDMI® source and the HDMI® sink in more detail.

If each of the HDMI® source 71 and the HDMI® sink 72 has the half duplex communication capability and the full duplex communication capability, the HDMI® source 71 and the HDMI® sink 72 are configured, for example, as shown in FIG. 14. Note that, in FIG. 14, the same numbering is used in describing FIG. 14 as was used in describing FIG. 6 or 7, and the description thereof are not repeated where appropriate.

An HDMI® source 71 shown in FIG. 14 includes a transmitter 81, a switching control unit 121, a timing control unit 122, and a switching control unit 171. The transmitter 81 includes a converting unit 131, a decoding unit 132, a switch 133, a switch 181, a switch 182, and a decoding unit 183. That is, the HDMI® source 71 shown in FIG. 14 has a configuration in which the timing control unit 122 and the decoding unit 132 shown in FIG. 6 are additionally provided to the HDMI® source 71 shown in FIG. 7.

In addition, an HDMI® sink 72 shown in FIG. 14 includes a receiver 82, a timing control unit 123, a switching control unit 124, and a switching control unit 172. The receiver 82 includes a converting unit 134, a switch 135, a decoding 136, a converting unit 184, a switch 185, and a switch 186. That is, the HDMI® sink 72 shown in FIG. 14 has a configuration in which the timing control unit 123 and the converting unit 134 shown in FIG. 6 are additionally provided to the HDMI® sink 72 shown in FIG. 7.

A communication process performed by the HDMI® source 71 and the HDMI® sink 72 shown in FIG. 14 is described next.

Figure 15:
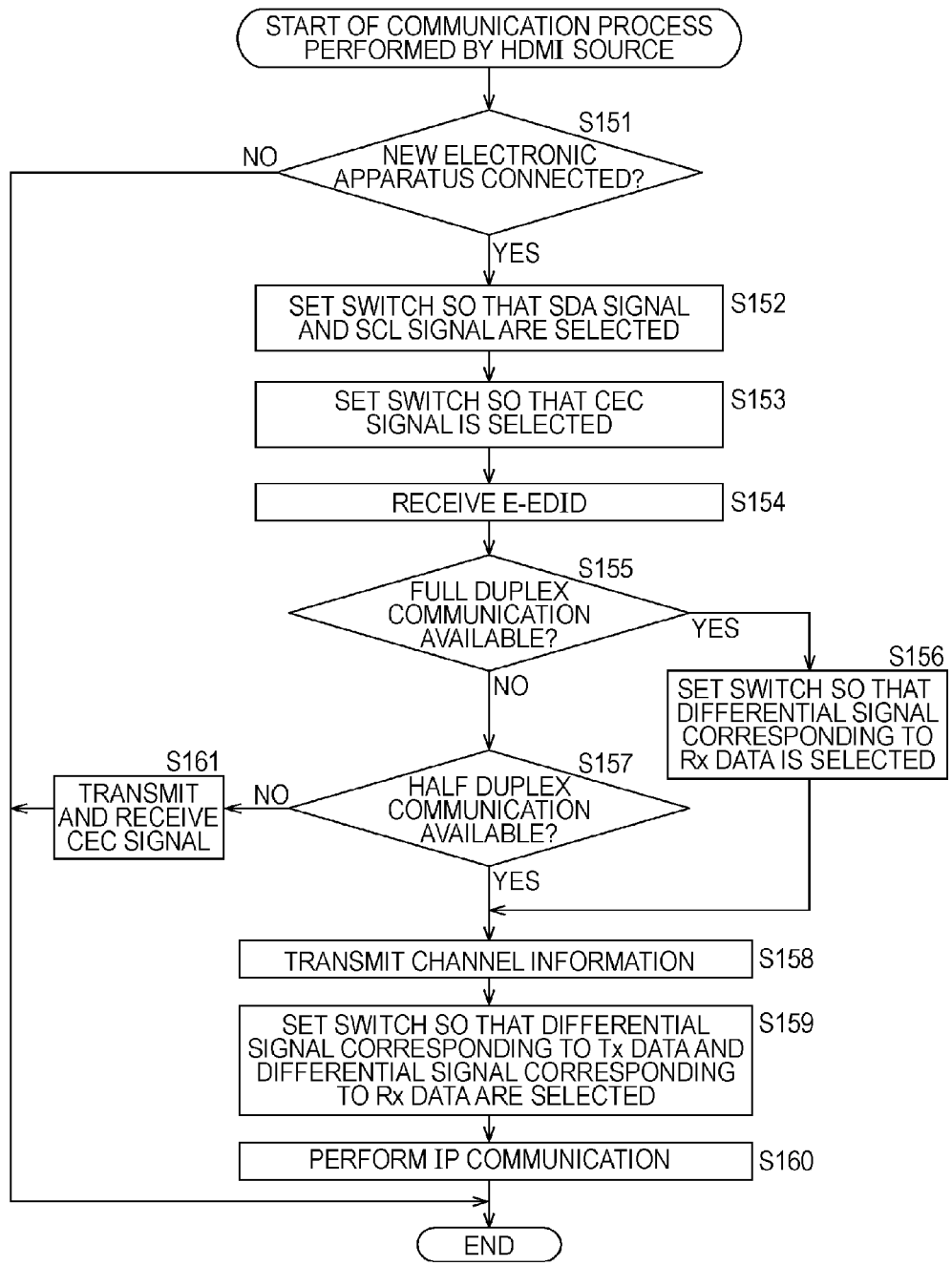
FIG. 15 is a flowchart illustrating a communication process performed by the HDMI® source.

First, a communication process performed by the HDMI® source 71 shown in FIG. 14 is described with reference to the flowchart shown in FIG. 15. Since the processes performed in steps S151 to S154 are the same as those performed in steps S71 to S74 shown in FIG. 12, respectively, and therefore, the descriptions thereof are not repeated.

In step S155, the HDMI® source 71 determines whether it can perform full duplex communication with the HDMI® sink 72. That is, the HDMI® source 71 refers to E-EDID received from the HDMI® sink 72 and determines whether the full duplex flag "Full Duplex" shown in FIG. 9 is set.

If, in step S155, it is determined that full duplex communication is available, that is, if the HDMI® sink 72 shown in FIG. 14 or FIG. 7 is connected to the HDMI® source 71, the switching control unit 171, in step S156, controls the switches 181 and 182 so that the switches 181 and 182 are switched to select the differential signal corresponding to Rx data from the receiver 82 when data is received.

However, if, in step S155, it is determined that full duplex communication is not available, the HDMI® source 71, in step S157, determines whether half duplex communication is available. That is, the HDMI® source 71 refers to the received E-EDID and determines whether the half duplex flag "Half Duplex" shown in FIG. 9 is set. In other words, the HDMI® source 71 determines whether the HDMI® sink 72 shown in FIG. 6 is connected to the HDMI® source 71.

If, in step S157, it is determined that half duplex communication is available, or if, in step S156, the switches 181 and 182 are switched, the HDMI® source 71, in step S158, transmits channel information to the receiver 82 via the switch 133 and the CEC line 84.

Here, if, in step S155, it is determined that full duplex communication is available, the HDMI® sink 72 has a full duplex communication capability. Accordingly, the HDMI® source 71 transmits, to the receiver 82 via the switch 133 and CEC line 84, a signal indicating that IP communication is performed using a pair consisting of the CEC line 84 and the signal line 141 and a pair consisting of the SDA line 191 and the SCL line 192 as channel information.

However, if, in step S157, it is determined that half duplex communication is available, the HDMI® sink 72 has a half duplex communication capability although it does not have a full duplex communication capability. Accordingly, the HDMI® source 71 transmits, to the receiver 82 via the switch 133 and the CEC line 84, a signal indicating that IP communication is performed using the CEC line 84 and the signal line 141, as channel information.

In step S159, the switching control unit 121 controls the switch 133 so that the switch 133 is switched to select the differential signal corresponding to the Tx data from the converting unit 131 when data is transmitted and to select the differential signal corresponding to the Rx data transmitted from the receiver 82 when data is received. When the HDMI® source 71 and the HDMI® sink 72 perform full duplex communication, the differential signal corresponding to the Rx data are not transmitted from the receiver 82 via the CEC line and the signal line 141 when the HDMI® source 71 receives data. Accordingly, the differential signal corresponding to the Rx data is not supplied to the decoding unit 132.

In step S160, each component of the HDMI® source 71 performs bidirectional IP communication with the HDMI® sink 72. Thereafter, the communication process is completed.

That is, when the HDMI® source 71 performs full duplex communication and half duplex communication with the HDMI® sink 72, the converting unit 131 converts the Tx data supplied from the HDMI® source 71 into a differential signal when data is transmitted. The converting unit 131 then transmits one of constituent signals forming the converted differential signal to the receiver 82 via the switch 133 and the CEC line 84 and transmits the other constituent signal to the receiver 82 via the signal line 141.

When the HDMI® source 71 performs full duplex communication with the HDMI® sink 72 and when data is received, the decoding unit 183 receives the differential signal corresponding to the Rx data transmitted from the receiver 82 and decodes the received differential signal into the original Rx data. The decoding unit 183 then outputs the original Rx data to the HDMI® source 71.

In contrast, when the HDMI® source 71 performs half duplex communication with the HDMI® sink 72 and when data is received, the decoding unit 132 receives the differential signal corresponding to the Rx data transmitted from the receiver 82 under the control of the timing control unit 122. The decoding unit 132 then decodes the received differential signal into the original Rx data and outputs the original Rx data to the HDMI® source 71.

In this manner, the HDMI® source 71 exchanges various data, such as control data, pixel data, and audio data, with the HDMI® sink 72.

However, if, in step S157, it is determined that half duplex communication is not available, each component of the HDMI® source 71, in step S161, performs bidirectional communication with the HDMI® sink 72 by receiving and transmitting the CEC signal via the CEC line 84. Thereafter, the communication process is completed.

In this manner, the HDMI® source 71 refers to the full duplex flag and the half duplex flag and performs full or half duplex communication with the HDMI® sink 72 in accordance with the capability of the HDMI® sink 72, which is a communication partner.

As described above, by switching the switches 133, 181 and 182 in accordance with the capability of the HDMI® sink 72 serving as a communication partner so as to select transmission data and reception data and performing full or half duplex communication with the HDMI® sink 72, high-speed bidirectional communication can be performed while maintaining compatibility with existing HDMI®.

Figure 16:
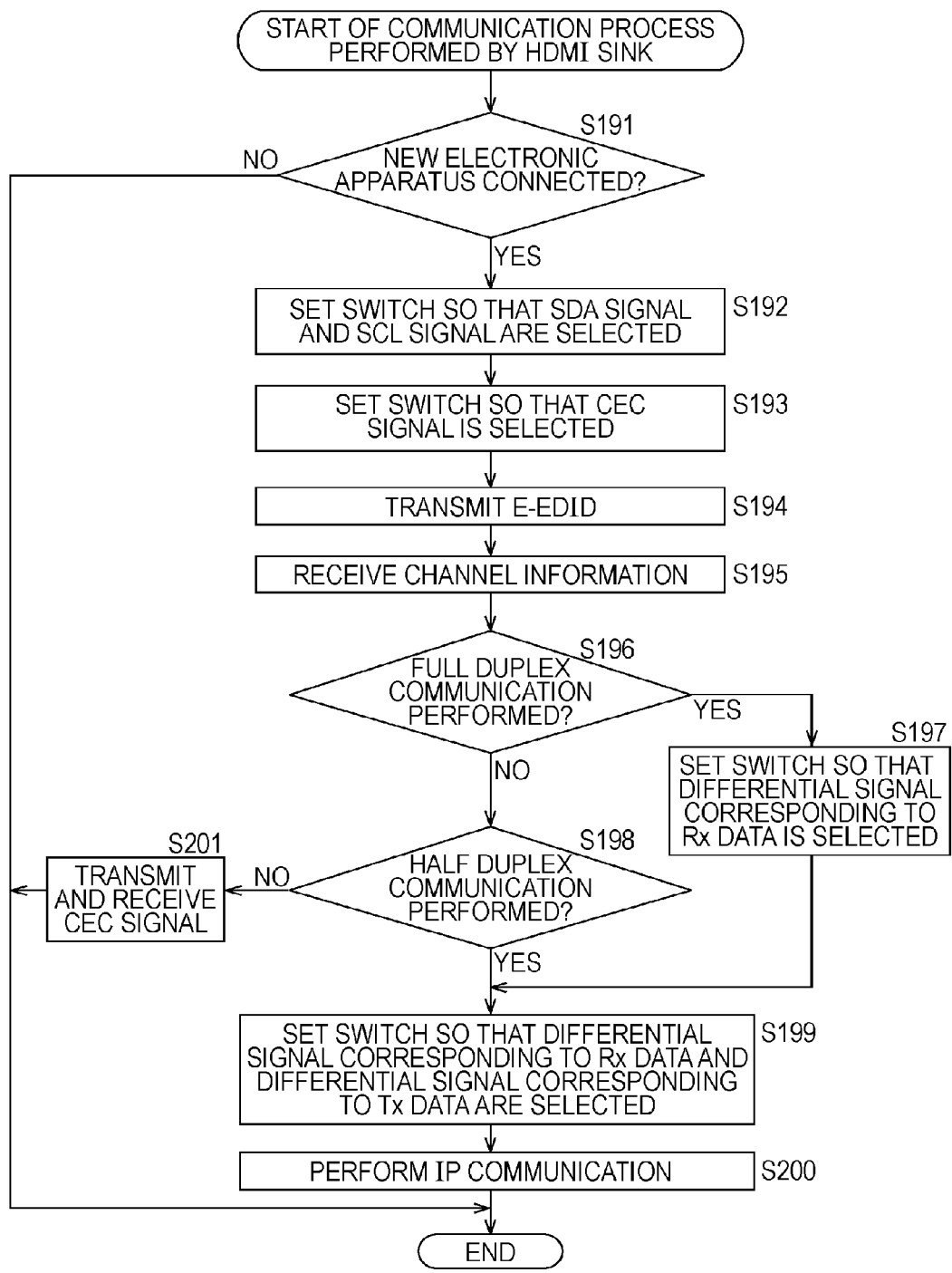
FIG. 16 is a flowchart illustrating a communication process performed by the HDMI® sink.

A communication process performed by the HDMI® sink 72 shown in FIG. 14 is described next with reference to the flowchart shown in FIG. 16. Processes performed in steps S191 to S194 are the same as those performed in steps S111 to S114 shown in FIG. 13, respectively, and therefore, the descriptions thereof are not repeated.

In step S195, the HDMI® sink 72 receives channel information transmitted from the HDMI® source 71 via the switch 135 and the CEC line 84. If the HDMI® source 71 connected to the HDMI® sink 72 has neither the full duplex communication capability nor the half duplex communication capability, the channel information is not transmitted from the HDMI® source 71 to the HDMI® sink 72. Accordingly, the HDMI® sink 72 does not receive the channel information.

In step S196, the HDMI® sink 72 determines whether full duplex communication is performed or not on the basis of the received channel information. For example, if the HDMI® sink receives the channel information indicating that IP communication is performed using the pair consisting of the CEC line 84 and the signal line 141 and the pair consisting of the SDA line 191 and the SCL line 192, the HDMI® sink 72 determines that full duplex communication is performed.

If, in step S196, it is determined that full duplex communication is performed, the switching control unit 172, in step S197, controls the switches 185 and 186 so that the switches 185 and 186 are switched to select the differential signal corresponding to Rx data from the converting unit 184 when data is transmitted.

However, if, in step S196, it is determined that full duplex communication is not performed, the HDMI® sink 72, in step S198, determines whether half duplex communication is performed on the basis of the received channel information. For example, if the HDMI® sink 72 receives the channel information indicating that IP communication using the CEC line 84 and the signal line 141 is performed, the HDMI® sink 72 determines that half duplex communication is performed.

If, in step S198, it is determined that half duplex communication is performed or if, in step S197, the switches 185 and 186 are switched, the switching control unit 124, in step S199, controls the switch 135 so that the switch 135 is switched to select the differential signal corresponding to Rx data from the converting unit 134 when data is transmitted and select the differential signal corresponding to Tx data from the transmitter 81 when data is received.

Note that, if the HDMI® source 71 and the HDMI® sink 72 perform full duplex communication, the differential signal corresponding to Rx data are not transmitted from the converting unit 134 to the transmitter 81 when data is transmitted at the HDMI® sink 72. Therefore, the differential signal corresponding to Rx data are not supplied to the switch 135.

In step S200, each component of the HDMI® sink 72 performs bidirectional IP communication with the HDMI® source 71. Thereafter, the communication process is completed.

That is, if the HDMI® sink 72 and the HDMI® source 71 perform full duplex communication and when data is transmitted, the converting unit 184 converts Rx data supplied from the HDMI® sink 72 into a differential signal. The converting unit 184 then supplies one of constituent signals forming the converted differential signal to the transmitter 81 via the switch 185 and the SDA line 191 and supplies the other constituent signal to the transmitter 81 via the switch 186 and the SCL line 192.

In addition, if the HDMI® sink 72 and the HDMI® source 71 perform half duplex communication and when data is transmitted, the converting unit 134 converts the Rx data supplied from the HDMI® sink 72 into a differential signal. The converting unit 134 then transmits one of constituent signals forming the converted differential signal to the transmitter 81 via the switch 135 and the CEC line 84 and transmits the other constituent signal to the transmitter 81 via the signal line 141.

Furthermore, if the HDMI® sink 72 and the HDMI® source 71 perform full duplex communication and half duplex communication and when data is transmitted, the decoding unit 136 receives the differential signal corresponding to Tx data transmitted from the transmitter 81. The decoding unit 136 then decodes the received differential signal into the original Tx data and outputs the original Tx data to the HDMI® sink 72.

However, if, in step S198, it is determined that half duplex communication is not performed, that is, if, for example, the channel information is not transmitted, each component of the HDMI® sink 72, in step S201, performs bidirectional communication with the HDMI® source 71 by receiving and transmitting the CEC signal from and to the HDMI® source 71. Thereafter, the communication process is completed.

In this manner, the HDMI® sink 72 performs full duplex communication or half duplex communication in accordance with the received channel information, that is, in accordance with the capability of the HDMI® source 71, which is the communication partner.

As described above, by switching the switches 135, 185 and 186 so as to select transmission data and reception data in accordance with the capability of the communication partner HDMI® source 71 and performing full duplex communication or half duplex communication, a more suitable communication method can be selected and high-speed bidirectional communication can be performed while maintaining compatibility with existing HDMI®.

In addition, by connecting the HDMI® source 71 to the HDMI® sink 72 using the HDMI® cable 35 which contains the CEC line 84 and the signal line 141 twisted together to form a shielded differential pair and connected to the ground line and the SDA line 191 and the SCL line 192 twisted together to form a shielded differential pair and connected to the ground line, high-speed bidirectional IP communication based on a half duplex communication method or a full duplex communication method can be performed while maintaining compatibility with an existing HDMI® cable.

As described above, any one of one or more data items is selected as transmission data. The selected data is transmitted to a communication partner via a predetermined signal line. Any one of one or more data items transmitted from the communication partner is selected as reception data, and the selected data is received. Accordingly, high-speed bidirectional IP communication can be performed between the HDMI® source 71 and the HDMI® sink 72 via the HDMI® cable 35 while maintaining compatibility with HDMI®, that is, while allowing high-speed unidirectional transmission of uncompressed pixel data of an image from the HDMI® source 71 to the HDMI® sink 72.

As a result, if a source device (e.g., an electronic apparatus, such as the reproducing apparatus 33 shown in FIG. 2) incorporating the HDMI® source 71 has, for example, a DLNA (Digital Living Network Alliance) server function and a sink device (e.g., an electronic apparatus, such as the digital television set 31 shown in FIG. 2) incorporating the HDMI® sink 72 includes a LAN communication interface, such as Ethernet (registered trademark), content can be transferred from the source device to the sink device via the HDMI® cable through bidirectional IP communication using an electronic apparatus (e.g., the amplifier 32) connected directly or via an HDMI® cable. In addition, the content from the source device can be transferred from the sink device to another device (e.g., the digital television set 34 shown in FIG. 2) connected to the LAN communication interface of the sink device.

Furthermore, with the bidirectional IP communication between the HDMI® source 71 and the HDMI® sink 72, control commands and responses can be exchanged at high speed between a source apparatus incorporating the HDMI® source 71 and a sink apparatus incorporating the HDMI® sink 72 interconnected by the HDMI® cable 35. Therefore, quick response control can be realized between the apparatuses.

As described below, the above-described series of processes may be realized by dedicated hardware or software. When the series of processes are realized by software, the program forming the software is installed in, for example, a microcomputer that controls the HDMI® source 71 and the HDMI® sink 72.

Figure 17:
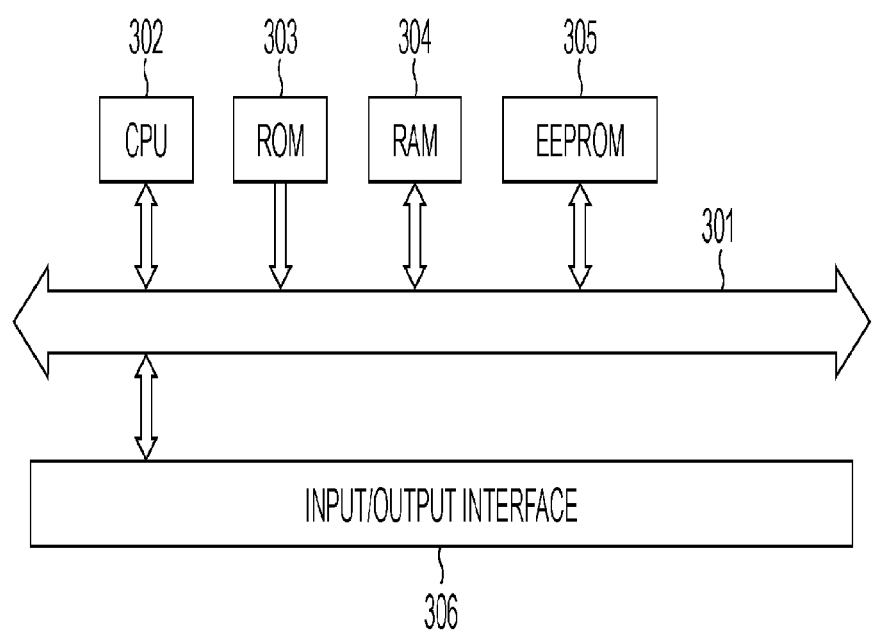
FIG. 17 is a block diagram illustrating an example of the configuration of a computer according to an embodiment of the present invention.

FIG. 17 illustrates an example of the configuration of a computer having the program for executing the above-described series of processes installed therein, according to an embodiment.

The program can be prerecorded in a recording medium, such as an electrically erasable programmable read-only memory (EEPROM) 305 or a ROM 303, incorporated in the computer.

Alternatively, the program can be temporarily or perpetually stored (recorded) in a removable recording medium, such as a compact disc read-only memory (CD-ROM), a magneto optical (MO) disc, a digital versatile disc (DVD), a magnetic disk, or a semiconductor memory. This removable recording medium can be provided in the form of so-called package software.

Note that, in addition to being installed from the above-described removable recording medium into the computer, the program may be wirelessly transferred from a download site to the computer via an artificial satellite for digital satellite broadcasting or may be transferred wired to the computer via a network, such as a LAN or the Internet. Subsequently, the computer can receive the transferred program using an input/output interface 306 and install the program in a built-in EEPROM 305.

The computer incorporates a central processing unit (CPU) 302. The input/output interface 306 is connected to the CPU 302 via a bus 301. The CPU 302 loads the program stored in a read-only memory (ROM) 303 or an EEPROM 305 into a random access memory (RAM) 304. The CPU 302 then executes the program. In this way, the CPU 302 executes the processes in accordance with the above-described flowcharts or the processes performed in the configurations shown in the above-described block diagrams.

In this specification, processing steps that describe the program for causing a computer to execute various processes need not be executed in the sequence described in the flowcharts, but may contain processes to be executed in parallel or independently (e.g., parallel processing or a process by an object).

In addition, the program may be executed by one computer or executed by a plurality of computers in a distributed manner.

The present invention is applicable to a communication interface including a transmitter and a receiver, in which the transmitter unidirectionally transmits a differential signal corresponding to pixel data of an uncompressed image of one screen to a receiver via a plurality of channels in an effective video period which is a period from one vertical synchronization signal to the next vertical synchronization signal excluding horizontal blanking intervals and a vertical blanking interval, and the receiver receives the differential signal transmitted via the plurality of channels.

In the present embodiment, bidirectional IP communication is performed by controlling, as needed, a data selection timing, a differential signal reception timing, and a differential signal transmission timing between the HDMI® source 71 and the HDMI® sink 72. However, the bidirectional communication can be performed using a protocol other than IP.

The embodiment of the present invention is not limited to the above-described embodiment, but various modifications can be made without departing from the spirit and scope of the invention.

According to the embodiment described above, bidirectional communication can be performed. In particular, high-speed bidirectional communication can be performed in a communication interface capable of transmitting pixel data of an uncompressed image and audio data associated with the pixel data while maintaining compatibility.

Additionally, many audio/video apparatuses have a LAN communication capability in order to provide interactive TV programs, highly advanced remote control, an electronic program guide and the like for the users, although some techniques thereof are the same as the already described techniques.

As means for forming a network among audio/video apparatuses, the following alternatives, for example, can be provided: installation of a dedicated cable, such as CAT5, wireless communication, and power line communication.

However, a dedicated cable makes the connection among the apparatuses complicated. Wireless communication and power line communication have disadvantages in that a required complicated modulation circuit and a transceiver are costly.

Accordingly, the above-described embodiment describes the techniques of adding a LAN communication capability without adding a new connector electrode to HDMI. HDMI is an interface for performing data transmission of video and audio data, exchange of connected device information, authentication of the connected device information, and communication of device control data by using a single cable. Therefore, HDMI has a significant advantage if a LAN communication capability is added to the HDMI and, therefore, LAN communication can be performed without using a dedicated cable and wireless communication or the like.

Note that, in the techniques described in the above-described embodiment, the differential transmission lines used for LAN communication are also used for exchange and authentication of connected device information and communication of device control data. In HDMI, a parasitic capacitance and an impedance of the electrical characteristics of a connected device are strictly restricted for the DDC that performs exchange and authentication of the connected device information and the CEC that performs communication of device control data.

More specifically, a DDC terminal parasitic capacitance of a device is required to be 50 pF or lower. The DDC terminal is required to be grounded to ground GND with an impedance of 200Ω or lower when LOW is output and to be pulled up to a power source with an impedance of about 2 kΩ in a HIGH state.

In addition, transmission/reception terminals are required to be terminated at least at about 100Ω in a high frequency range in order to stabilize LAN communication that transmits a high-speed signal.

Figure 19:
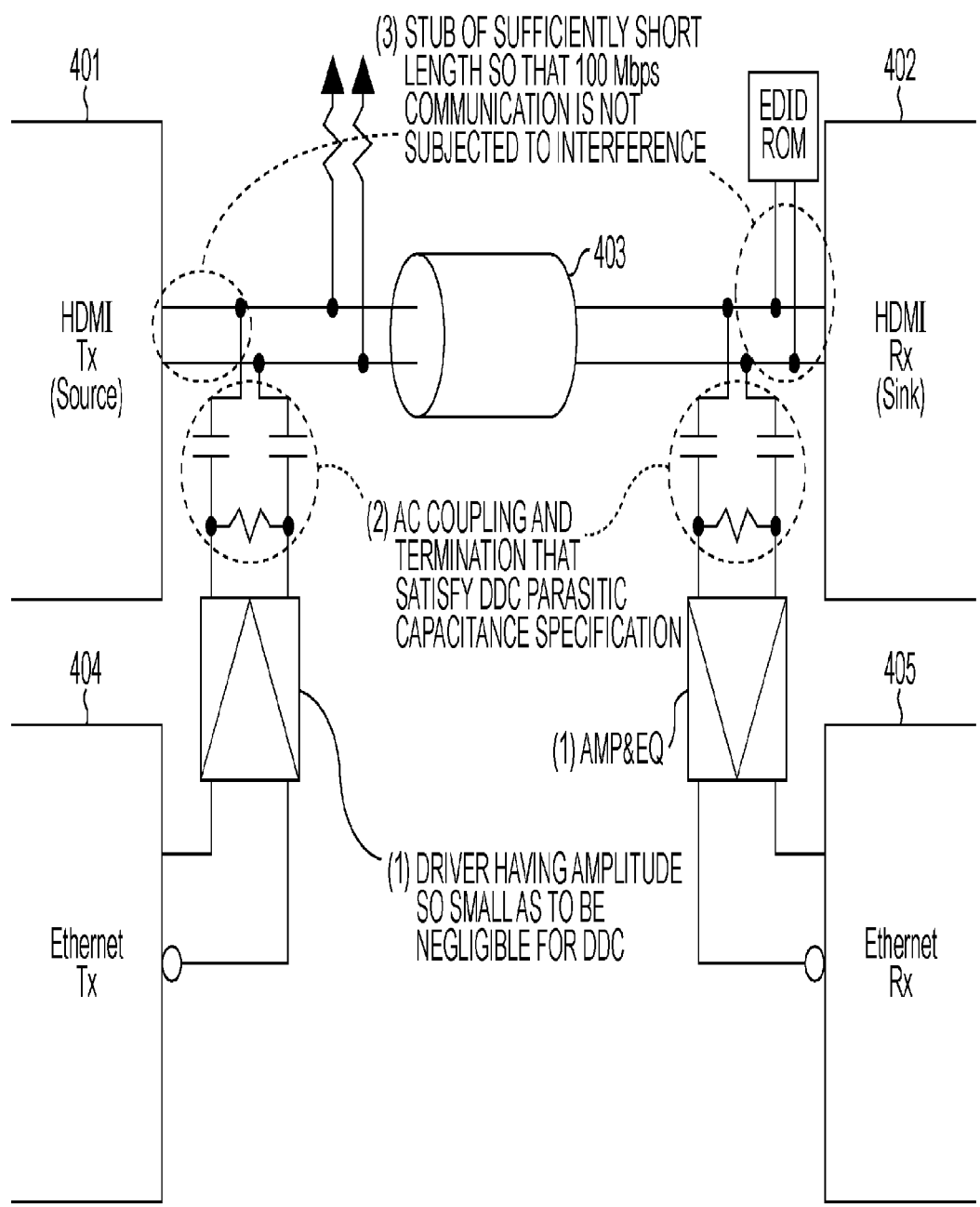
FIG. 19 is a diagram illustrating an example of the configuration of a system when the system is connected to Ethernet (registered trademark).

FIG. 19 illustrates the state in which a transmitter 404 and a receiver 405 are constantly AC-coupled to DDC lines of an existing HDMI source device 401 and an existing HDMI sink device 402.

In order to satisfy the DDC parasitic capacitance restrictions, a LAN transmitter and receiver circuit added to the DDC lines need to have AC coupling via a sufficiently small capacitance. Therefore, a LAN signal is significantly attenuated, and therefore, is distorted. Consequently, a transmission and reception circuit for correcting the distortion may become complicated and costly.

In addition, transition between the HIGH and LOW states during DDC communication may interfere with LAN communication. That is, the LAN may not function during DDC communication.

Accordingly, a communication system according to a more preferable embodiment is described below. The communication system is characterized in that, in an interface that basically performs data transmission of video and audio data, exchange and authentication of connected device information, communication of device control data, and LAN communication by using a single cable, the LAN communication is performed through bidirectional communication via a pair of differential transmission lines, and a connection state of the interface is notified using the DC bias potential of at least one of the transmission lines.

Unlike the above-described embodiment, in the technique described below, a selecting unit is not necessarily required.

Figure 18:
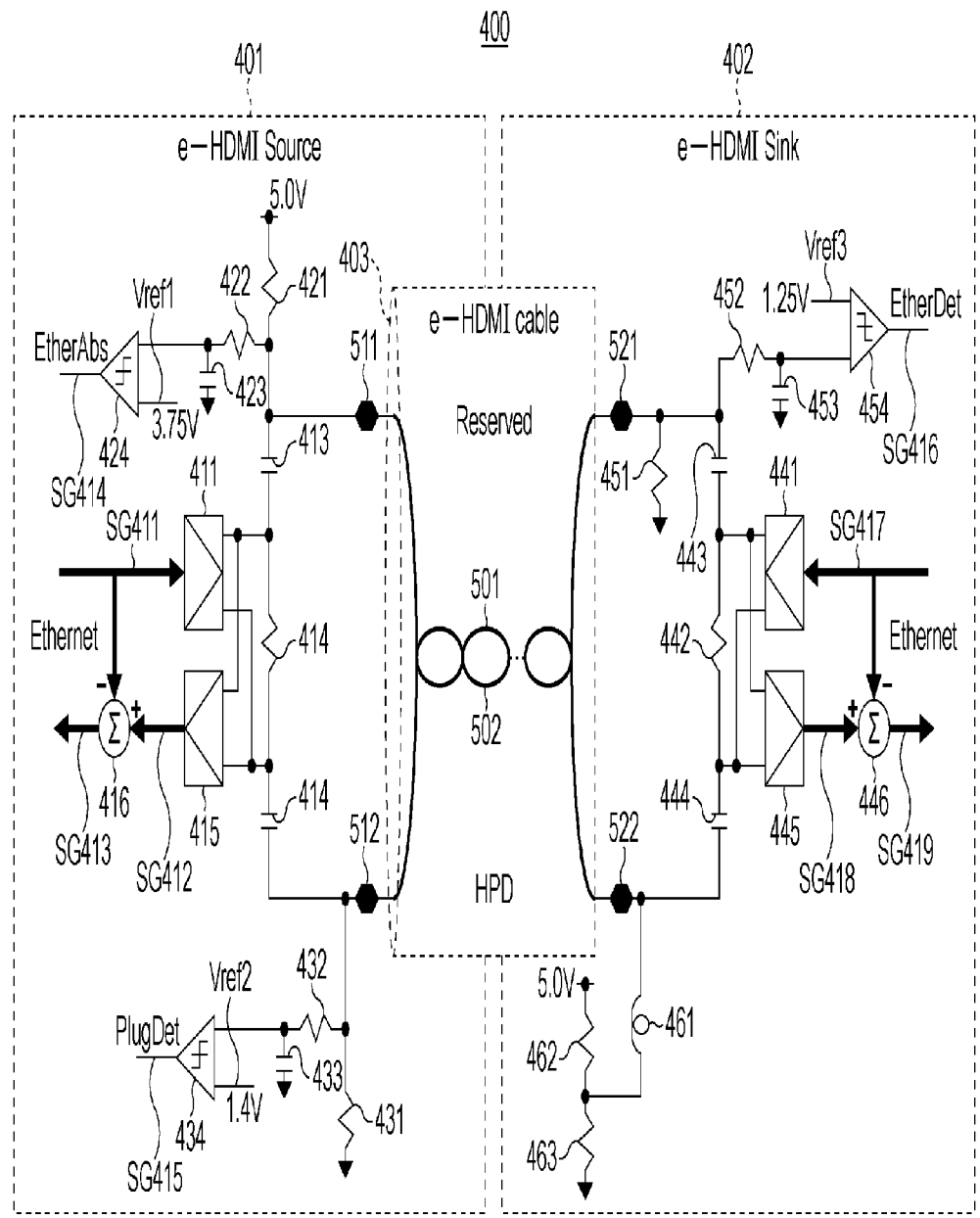
FIG. 18 is a circuit diagram illustrating a first example of the configuration of a communication system in which the connection state of an interface is notified by using a DC bias potential of at least one of two transmission lines.

FIG. 18 is a circuit diagram illustrating a first example of the configuration of a communication system in which a connection state of the interface is notified using the DC bias potential of at least one of the transmission lines.

FIG. 19 illustrates an example of a system provided with Ethernet (registered trademark).

As shown in FIG. 18, this communication system 400 includes a LAN function expansion HDMI (hereinafter referred to as "EH") source device 401, an EH sink device 402, an EH cable 403 for connecting the EH source device to the EH sink device, an Ethernet (registered trademark) transmitter 404 and an Ethernet (registered trademark) receiver 405.

The EH source device 401 includes a LAN signal transmitter circuit 411, a terminating resistor 412, AC coupling capacitors 413 and 414, a LAN signal receiver circuit 415, a subtracting circuit 416, a pull-up resistor 421, a resistor 422 and a capacitor 423 forming a lowpass filter, a comparator 424, a pull-down resistor 431, a resistor 432 and a capacitor 433 forming a lowpass filter, and a comparator 434.

The EH sink device 402 includes a LAN signal transmitter circuit 441, a terminating resistor 442, AC coupling capacitors 443 and 444, a LAN signal receiver circuit 445, a subtracting circuit 446, a pull-down resistor 451, a resistor 452 and a capacitor 453 forming a lowpass filter, a comparator 454, a choke coil 461, and resistors 462 and 463 connected in series between a power source potential and a reference potential.

The EH cable 403 contains differential transmission lines composed of a reserved line 501 and an HPD Line 502. Thus, a source side terminal 511 of the reserved line 501, a source side terminal 512 of the HPD Line 502, a sink side terminal 521 of the reserved line 501, and a sink side terminal 522 of the HPD line are formed. The reserved line 501 and HPD line 502 are twisted together so as to form a twisted wire differential pair.

In the source device 401 of the communication system 400 having such a configuration, the terminals 511 and 512 are connected to the terminating resistor 412, the LAN signal transmitter circuit 411, and the LAN signal receiver circuit 415 via the AC coupling capacitors 413 and 414.

The subtracting circuit 416 receives a sum signal SG412 of a transmission signal voltage generated by an electrical current output from the LAN signal transmitter circuit 411 using the terminating resistor 412 and the transmission lines 501 and 502 as loads and a reception signal voltage of a signal transmitted from the EH sink device 402.

In the subtracting circuit 416, a signal SG413 obtained by subtracting the transmission signal SG411 from the sum signal SG412 is a net signal transmitted from the sink.

The sink device 402 has a similar circuit network. With these circuits, the source device 4011 and the sink device 402 perform bidirectional LAN communication.

In addition to performing the above-described LAN communication, by using a DC bias level, the HPD line 502 sends, to the source device 401, information indicating that the cable 403 is connected to the sink device 402.

When the cable 403 is connected to the sink device 402, the resistors 462 and 463 and the choke coil 461 in the sink device 402 apply a bias to the HPD line 502 via the terminal 522 so that the HPD Line 502 is biased at about 4 V.

The source device 401 extracts a DC bias of the HPD line 502 using the lowpass filter composed of the resistor 432 and the capacitor 433. Thereafter, the source device 401 compares the DC bias with the reference potential Vref2 (e.g., 1.4 V) using the comparator 434.

If the cable 403 is not connected to the source device 402, a potential of the terminal 512 is lower than the reference potential Vref2 due to the pull-down resistor 431. However, if the cable 403 is connected to the source device 402, the potential is higher than the reference potential.

Therefore, an output signal SG415 of the comparator 434 being HIGH indicates that the cable 403 is connected to the sink device 402.

In contrast, the output signal SG415 of the comparator 434 being LOW indicates that the cable 403 is not connected to the sink device 402.

The first example of the configuration further has a function of mutually recognizing, using the DC bias potential of the reserved line 501, whether the devices connected to either end of the cable 403 are EH compatible apparatuses or HDMI apparatuses that are not compatible with EH.

The EH source device 401 pulls up (+5 V) the reserved line 501 by using the pull-up resistor 421, whereas the EH sink device 402 pulls down the reserved line 501 by using the pull-down resistor 451.

These resistors 421 and 451 are not included in an apparatus that does not support EH.

Using the comparator 424, the EH source device 401 compares a DC potential of the reserved line 501 that has passed through the lowpass filter composed of the resistor 422 and the capacitor 423 with a reference voltage Vref1.

When the sink device 402 is EH compatible and is pulled down, the potential of the reserved line 501 is 2.5 V. However, when the sink device 402 is not EH compatible and is open, the potential of the reserved line is 5 V. Therefore, if the reference potential Vref1 is set to 3.75 V, it can be determined whether the sink device is EH compatible or EH incompatible.

Using the comparator 454, the sink device 402 compares the DC potential of the reserved line 501 that has passed through the lowpass filter composed of the resistor 452 and the capacitor 453 with a reference voltage Vref3.

If the source device 401 is EH compatible and has a pull-up function, the potential of the reserved line 501 is 2.5 V. However, if the source device 401 is not EH compatible, the potential of the reserved line 501 is 0 V. Therefore, if the reference potential is set to 1.25 V, it can be determined whether the source device is EH compatible or EH incompatible.

As described above, according to the first example of the configuration, in the interface which performs data transmission of video data and audio data, exchange and authentication of connected device information, communication of device control data, and LAN communication by using the single cable 403, the LAN communication is performed through bidirectional communication via a pair of differential transmission lines, and the connection state of the interface is notified by using the DC bias potential of at least one of the transmission lines. Therefore, spatial separation can be performed without physically using the SCL line and the SDA line for the LAN communication.

As a result, this division allows a LAN communication circuit to be formed independently from the electrical specifications defined for the DDC. Thus, stable and reliable LAN communication can be realized at low cost.

Note that, the pull-up resistor 421 shown in FIG. 18 may be provided in the EH cable 403, not in the source device 401. In such a case, the terminals of the pull-up resistor 421 are connected to the reserved line 501 and a line (a signal line) connected to the power source (the power source potential) of the lines provided in the EH cable 403.

In addition, the pull-down resistor 451 and the resistor 463 shown in FIG. 18 may be provided in the EH cable 403, not the EH sink device 402. In such a case, the terminals of the pull-down resistor 451 are connected to the reserved line 501 and a line (a ground line) connected to ground (the reference potential) of the lines provided in the EH cable 403. Furthermore, the terminals of the resistor 463 are connected to the HPD Line 502 and the line (the ground line) connected to ground (the reference potential) of the lines provided in the EH cable 403.

Figure 20:
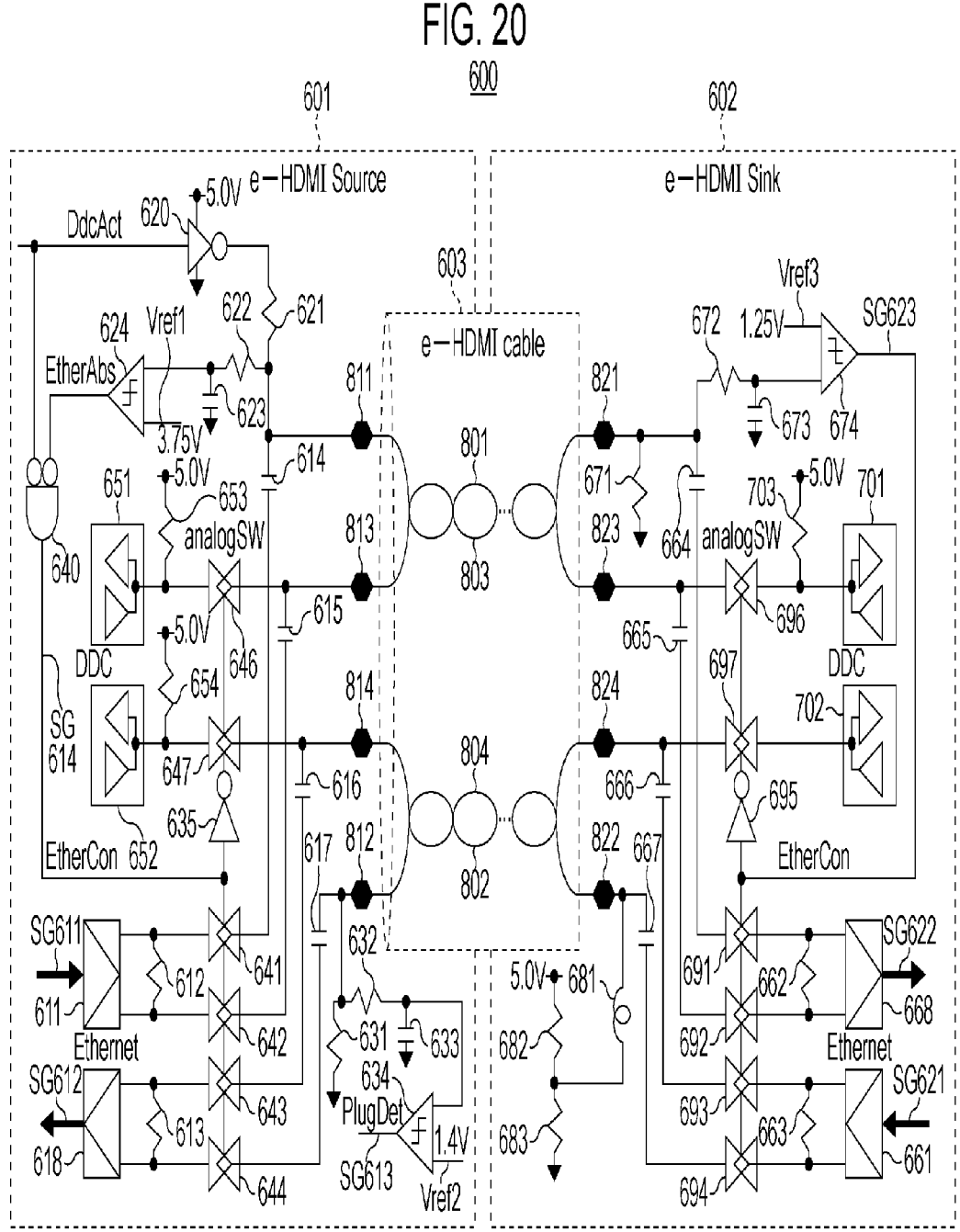
FIG. 20 is a circuit diagram illustrating a second example of the configuration of the communication system in which the connection state of an interface is notified by using a DC bias potential of at least one of two transmission lines.

FIG. 20 is a circuit diagram illustrating a second example of the configuration of the communication system in which a connection state of the interface is notified using the DC bias potential of at least one of the transmission lines.

Like the first example of the structure, this communication system 600 is basically characterized in that, in the interface that performs data transmission of video data and audio data, exchange and authentication of connected device information, communication of device control data, and LAN communication by using a single cable, the LAN communication is performed through unidirectional communication via two pairs of differential transmission lines, and a connection state of the interface is notified using the DC bias potential of at least one of the transmission lines, and in that at least two transmission lines are used for communication of exchange and authentication of connected device information in a time multiplexed manner with LAN communication.

As shown in FIG. 20, this communication system 600 includes a LAN function expansion HDMI (hereinafter referred to as "EH") source device 601, an EH sink device 602, and an EH cable 603 for connecting the EH source device to the EH sink device.

The EH source device 601 includes a LAN signal transmitter circuit 611, terminating resistors 612 and 613, AC coupling capacitors 614 to 617, a LAN signal receiver circuit 618, an inverter 620, a resistor 621, a resistor 622 and a capacitor 623 forming a lowpass filter, a comparator 624, a pull-down resistor 631, a resistor 632 and a capacitor 633 forming a lowpass filter, a comparator 634, a NOR gate 640, analog switches 641 to 644, an inverter 635, analog switches 646 and 747, DDC transceivers 651 and 652, and pull-up resistors 653 and 654.

The EH sink device 602 includes a LAN signal transmitter circuit 661, terminating resistors 662 and 663, AC coupling capacitors 664 to 667, a LAN signal receiver circuit 668, a pull-down resistor 671, a resistor 672 and a capacitor 673 forming a lowpass filter, a comparator 674, a choke coil 681, resistors 682 and 683 connected in series between a power source potential and a reference potential, analog switches 691 to 694, an inverter 695, analog switches 696 and 697, DDC transceivers 701 and 702, and a pull-up resistor 703.

The EH cable 603 contains differential transmission lines composed of a reserved line 801 and an SCL line 803 and differential transmission lines composed of an SDA line 804 and an HPD line 802. Thus, source side terminals 811 to 814 and sink side terminals 821 to 824 are formed.

The reserved line 801 and the SCL line 803 are twisted together so as to form a twisted wire differential pair, and the SDA line 804 and HPD line 802 are twisted together so as to form a twisted wire differential pair.

In the sink device 601 of the communication system 600 having such a configuration, the terminals 811 and 813 are connected to the transmitter circuit 611 for transmitting a LAN transmission signal SG611 to the sink via the AC coupling capacitors 614 and 615 and the analog switches 641 and 642 and to the terminating resistor 612.

The terminals 814 and 812 are connected, via the AC coupling capacitors 616 and 617 and the analog switches 643 and 644, to the receiver circuit 618 for receiving a LAN signal from the sink device 602 and to the terminating resistor 613.

In the sink device 602, the terminals 821 to 824 are connected, via the AC coupling capacitors 664, 665, 666 and 667 and the analog switches 691 to 694, to the transmitter and receiver circuits 668 and 661 and the terminating resistors 662 and 663.

The analog switches 641 to 644 and the analog switches 691 to 694 are made conductive when LAN communication is performed and are made open when DDC communication is performed.

The source device 601 connects the terminals 813 and 814 to the DDC transceivers 651 and 652 and the pull-up resistors 653 and 654 via the analog switches 646 and 647, respectively.

The sink device 602 connects the terminals 823 and 824 to the DDC transceivers 701 and 702 and the pull-up resistor 703 via the analog switches 696 and 697, respectively.

The analog switches 646, 647, 696 and 697 are made conductive when DDC communication is performed and are made open when DLAN communication is performed.

The recognition mechanism of an EH compatible apparatus using the potential of the reserved line 801 is basically the same as that of the first example of the configuration, except that the resistor 62 of the source device 601 is driven by the inverter 620.

When an input to the inverter 620 is HIGH, the resistor 621 functions as a pull-down resistor providing a 0-V mode from the viewpoint of the sink device 602, as in the case where an EH compatible apparatus is connected.

As a result, a signal SG623 indicating an EH compatibility identification result of the sink device 602 becomes LOW so that the analog switches 691 to 694 controlled by the signal SG623 are made open, whereas the analog switches 696 and 697 controlled by a signal obtained by inverting the signal SG623 using the inverter 695 are made conductive.

As a result, the sink device 602 enters a mode in which the SCL line 803 and the SDA line 804 are disconnected from the LAN transceiver and are connected to the DDC transceiver.

On the other hand, in the source device 601, an input to the inverter 620 is also input to the NOR gate 640 so that the output SG614 of the NOR gate 640 becomes LOW.

The analog switches 641 to 6444 controlled by the output signal SG614 of the NOR gate 640 are made open, whereas the analog switches 646 and 647 controlled by a signal obtained by inverting the signal SG614 using the inverter 645 are made conductive.

As a result, the source device 601 also enters a mode in which the SCL line 803 and the SDA line 804 are disconnected from the LAN transceiver and are connected to the DDC transceiver.

In contrast, when an input to the inverter 620 is LOW, each of the source device 601 and the sink device 602 enters a mode in which the SCL line 803 and the SDA line 804 are disconnected from the DDC transceiver and are connected to the LAN transceiver.

The circuits 631 to 634 and the circuits 681 to 683 used for examining connection using the DC bias potential of the HPD line 802 have the functions the same as those of the first example of the configuration.

That is, in addition to performing the above-described LAN communication, by using the DC bias level, the HPD Line 802 sends, to the source device 601, information indicating that the cable 803 is connected to the sink device 802.

When the cable 803 is connected to the sink device 602, the resistors 682 and 683 and the choke coil 681 in the sink device 602 applies a bias to the HPD line 802 via the terminal 822 so that the HPD line 802 is biased at about 4 V.

The source device 601 extracts the DC bias of the HPD line 802 using the lowpass filter composed of the resistor 632 and the capacitor 633 and compares the DC bias with the reference potential Vref2 (e.g., 1.4 V) using the comparator 634.

If the cable 603 is not connected to the source device 602, the potential of the terminal 812 is lower than the reference potential Vref2 due to the pull-down resistor 631. However, if the cable 603 is connected to the source device 602, the potential is higher than the reference potential Vref2.

Therefore, an output signal SG613 of the comparator 634 being HIGH indicates that the cable 803 is connected to the sink device 602.

In contrast, the output signal SG613 of the comparator 634 being LOW indicates that the cable 603 is not connected to the sink device 602.

As described above, according to the second example of the configuration, in the interface that performs data transmission of video data and audio data, exchange and authentication of connected device information, communication of device control data, and LAN communication by using a single cable, the LAN communication is performed through unidirectional communication via two pairs of differential transmission lines, and a connection state of the interface is notified by the DC bias potential of at least one of the transmission lines. Furthermore, at least two transmission lines are used for communication of exchange and authentication of connected device information in a time multiplexed manner with LAN communication. Accordingly, time multiplexing in which the time during which the SCL line and the SDA line are connected to the LAN communication circuit is separated from the time during which the SCL line and the SDA line are connected to the DDC circuit is available. This division allows a LAN communication circuit to be formed independently from the electrical specifications defined for the DDC, and therefore, stable and reliable LAN communication can be realized at low cost.

Note that, the resistor 621 shown in FIG. 20 may be provided in the EH cable 603, not in the EH source device 601. In such a case, the terminals of the resistor 621 are connected to the reserved line 801 and a line (a signal line) connected to the power source (the power source potential) of the lines provided in the EH cable 603.

In addition, the pull-down resistor 671 and the resistor 683 shown in FIG. 20 may be provided in the EH cable 603, not the EH sink device 602. In such a case, the terminals of the pull-down resistor 671 are connected to the reserved line 801 and a line (a ground line) connected to ground (the reference potential) of the lines provided in the EH cable 603. Furthermore, the terminals of the resistor 683 are connected to the HPD Line 802 and the line (the ground line) connected to ground (the reference potential) of the lines provided in the EH cable 603.

As described above, in the embodiment related to FIGS. 2 to 17, of nineteen HDMI poles, SDA and SCL are used as a first differential pair, and CEC and Reserved are used as a second pair so that full duplex communication in which unidirectional communication is performed in each pair is realized.

However, in SDA and SCL, communication is performed at 1.5 KΩ pull-up for H and at a low impedance for L. In addition, in CEC, communication is performed at 27 KΩ pull-up for H and at a low impedance for L.

If these functions are maintained in order to maintaining compatibility with existing HDMI, sharing of a LAN function for high-speed data communication that requires impedance matching at terminating ends of a transmission line may be difficult.

Therefore, in the first example of the configuration, full duplex communication is realized by using pair bidirectional communication using a differential pair of Reserved and HPD without using the SDA, SCL and CEC lines.

Since HPD is a DC-level flag signal, injection of a LAN signal using AC coupling and transmission of DC-level plug information can be performed at the same time. A new function is provided to Reserved so that both parties can mutually recognize that the terminal has a LAN function by using a DC level and a method similar to that for HPD.

In the second example of the configuration, two differential pairs are formed using HPD, SDA, SCL, and Reserved. Unidirectional communication is performed by each of the pairs so that two-pair full duplex communication is realized.

In HDMI, the transmitter serves as a master at all times, and timing of burst DDC communication using SDA and SCL is controlled by the transmitter.

In this example, the analog switches are operated so that, when the transmitter performs DDC communication, the SDA and SCL lines are connected to the DDC transceiver and, when a transmitter does not perform DDC communication, the lines are connected to the LAN transceiver.

These switch control signals are also transmitted to the receiver using a DC level of the Reserved line. Similar switching operations are performed on the receiver side.

By employing the above-described configurations, a first advantage can be provided in that SCL, SDA and CEC communication is not subjected to interference by noise of LAN communication, and therefore, stable DDC and CEC communication can be ensured at all times.

This is because, in the first example of the configuration, a LAN is physically disconnected from these lines and, in the second example of the configuration, a LAN signal is disconnected from these lines using switches during the DDC communication.

A second advantage is provided in that stable communication having a wide margin is realized by performing LAN communication using the lines having ideal termination ends.

This is because, in the first example of the configuration, a LAN signal is superposed upon Reserved and HPD lines that transmit only DC-level signals, and therefore, a terminating impedance having an ideal value can be maintained in a sufficiently wide frequency range necessary for LAN communication, and in the second example of the configuration, LAN terminating circuits that are not allowed to be used for DDC communication are connected using the switches only during LAN communication.

FIGS. 21A to 21E are diagrams illustrating the waveforms of bidirectional communication in the communication system of the first and second examples of the configurations.

FIG. 21A illustrates the waveform of a signal transmitted from an EH sink device. FIG. 21B illustrates the waveform of a signal received by the EH sink device. FIG. 21C illustrates the waveform of a signal passing through the cable.

FIG. 21D illustrates the waveform of a signal received by an EH source device. FIG. 21E illustrates the waveform of a signal transmitted from the EH source device.

As can be seen from FIG. 21, according to the examples of the configuration, excellent bidirectional communication can be realized.

The invention claimed is:

1. A receiver for receiving, using a first differential signal, pixel data and audio data unidirectionally transmitted from a transmitter and, the pixel data being pixel data of an uncompressed image of one screen during an effective video period representing a period from one vertical synchronization signal to the next vertical synchronization signal excluding horizontal blanking intervals and a vertical blanking interval, the receiver comprising:
   a signal transmitting unit configured to transmit, to the transmitter, a third differential signal representing transmission data different from the pixel data via differential transmission lines formed from a pair consisting of a first signal line and a second signal line;
   a signal receiving unit connected to the signal transmitting unit, the signal receiving unit receiving, from the transmitter, a second differential signal transmitted via the first signal line and the second signal line; and
   a subtracting circuit configured to subtract the third differential signal from the signal received by the signal receiving unit,
   the received pixel data and audio data corresponding to content, and the receiver being operable to display images and output sound so as to play back the content.

2. The receiver according to claim 1, wherein the second signal line is an HPD signal line.

3. The receiver according to claim 1, wherein the first signal line is a Reserved signal line.

4. The receiver according to claim 1, further comprising:
   a device connection notifying unit configured to notify, using a DC bias potential of the second signal line, the transmitter of information as to whether the receiver is connected via the differential transmission lines.

5. The receiver according to claim 1, further comprising:
   a comparator configured to compare a DC bias potential of the first signal line with a predetermined reference voltage.

6. The receiver according to claim 1, further comprising:
a resistor in a circuit that connects the signal transmitting unit to the signal receiving unit.

7. The receiver according to claim 1, wherein the receiver has information regarding a performance of the receiver to be transmitted to the transmitter.

8. A receiving method for use in a receiver, the receiver receiving, using a first differential signal, pixel data and audio data unidirectionally transmitted from a transmitter, the pixel data being pixel data of an uncompressed image of one screen during an effective video period representing a period from one vertical synchronization signal to the next vertical synchronization signal excluding horizontal blanking intervals and a vertical blanking interval, the method comprising the steps of:

transmitting, to the transmitter by a signal transmitting unit, a third differential signal representing transmission data different from the pixel data via differential transmission lines formed from a pair consisting of a first signal line and a second signal line;

receiving, by a signal receiving unit connected to the signal transmitting unit, a second differential signal transmitted from the transmitter via the first signal line and the second signal line; and a subtracting circuit configured to subtract the third differential signal from the signal received by the signal receiving unit, the received pixel data and audio data corresponding to content, and the receiver being operable to display images and output sound so as to play back the content.

\* \* \* \* \*